(12) United States Patent
Narayanan et al.

(10) Patent No.: US 9,333,580 B2
(45) Date of Patent: May 10, 2016

(54) GAS-LESS PROCESS AND SYSTEM FOR GIRTH WELDING IN HIGH STRENGTH APPLICATIONS

(75) Inventors: Badri Narayanan, Mayfield Heights, OH (US); Patrick T. Soltis, Shaker Heights, OH (US); Russell Kenneth Myers, Hudson, OH (US); Eric Stewart, Girard, PA (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 2806 days.

(21) Appl. No.: 11/382,084

(22) Filed: May 8, 2006

(65) Prior Publication Data

US 2007/0108174 A1    May 17, 2007

Related U.S. Application Data

(63) Continuation-in-part of application No. 10/834,141, filed on Apr. 29, 2004, now Pat. No. 7,166,817, and a continuation-in-part of application No. 10/959,587, filed on Oct. 6, 2004, and a continuation-in-part of application No. 11/263,064, filed on Oct. 31, 2005, and a continuation-in-part of application No. 11/336,506, filed on Jan. 20, 2006.

(51) Int. Cl.
*B23K 9/10* (2006.01)
*B23K 9/028* (2006.01)
(Continued)

(52) U.S. Cl.
CPC .............. *B23K 9/0282* (2013.01); *B23K 9/092* (2013.01); *B23K 9/23* (2013.01)

(58) Field of Classification Search
CPC .................................... B23K 9/09; B23K 9/10

USPC ........... 219/137 PS, 137 WM, 145.22, 145.1, 219/130.1, 130.21, 130.4, 146.52
See application file for complete search history.

(56) References Cited

U.S. PATENT DOCUMENTS

| 1,888,453 A | 11/1932 | De Pape |
| 1,946,958 A | 2/1934 | Anastasiadis |

(Continued)

FOREIGN PATENT DOCUMENTS

| CA | 749527 | 12/1966 |
| EP | 0 125 925 A2 | 11/1984 |

(Continued)

OTHER PUBLICATIONS

JP 09038772 A-H translation.*

(Continued)

*Primary Examiner* — Dana Ross
*Assistant Examiner* — Ayub Maye
(74) *Attorney, Agent, or Firm* — Perkins Coie LLP

(57) ABSTRACT

A welding system and method is disclosed for girth welding high strength materials using a short arc welding process and a self-shielding electrode. The welding system contains a welding apparatus which advances the self-shielding electrode towards a workpiece to be welded and controls the arc length and the operation of the apparatus so that the weld satisfies the requirements for welding at least American Petroleum Institute Grade X-80 line pipe. The system additionally contains a power source with a controller for creating a current pulse introducing energy into the electrode to melt the end of the self-shielding electrode and a low current quiescent metal transfer section following the end of the melting pulse during which the melted electrode short circuits against the workpiece.

43 Claims, 11 Drawing Sheets

(51) Int. Cl.
  *B23K 9/09* (2006.01)
  *B23K 9/23* (2006.01)

(56) References Cited

U.S. PATENT DOCUMENTS

| | | | |
|---|---|---|---|
| 2,802,762 A | 8/1957 | Stetson et al. | |
| 3,177,340 A | 4/1965 | Danhier | |
| 3,340,103 A | 9/1967 | Ballass et al. | |
| 3,415,976 A | 12/1968 | Smith | |
| 3,424,892 A * | 1/1969 | Wilcox | 219/137 R |
| 3,458,685 A | 7/1969 | Tezuka | |
| 3,461,270 A | 8/1969 | Patton | |
| 3,466,417 A | 9/1969 | Chapman et al. | |
| 3,539,765 A | 11/1970 | Duttera et al. | |
| 3,560,702 A | 2/1971 | Arikawa et al. | |
| 3,566,073 A | 2/1971 | Black | |
| 3,573,426 A | 4/1971 | Blake et al. | |
| 3,585,343 A | 6/1971 | Crichton | |
| 3,596,053 A | 7/1971 | Kameda | |
| 3,627,574 A | 12/1971 | Delong | |
| 3,670,135 A | 6/1972 | Zvanut | |
| 3,702,390 A | 11/1972 | Blake et al. | |
| 3,742,185 A | 6/1973 | Parks | |
| 3,767,891 A | 10/1973 | Haverstraw et al. | |
| 3,769,491 A | 10/1973 | De Long et al. | |
| 3,778,588 A | 12/1973 | Bishel | |
| 3,778,589 A | 12/1973 | Nakabayashi et al. | |
| 3,787,658 A | 1/1974 | Kammer et al. | |
| 3,866,015 A | 2/1975 | Matsumoto et al. | |
| 3,883,713 A | 5/1975 | Gurevich et al. | |
| 3,911,244 A | 10/1975 | Nakamura et al. | |
| 4,010,309 A | 3/1977 | Peterson | |
| 4,020,320 A | 4/1977 | Pijls | |
| 4,072,845 A | 2/1978 | Buckingham | |
| 4,122,238 A | 10/1978 | Frantzerb | |
| 4,131,784 A | 12/1978 | Kimura et al. | |
| 4,149,063 A | 4/1979 | Bishel | |
| 4,154,999 A * | 5/1979 | Pinfold et al. | 219/72 |
| 4,186,293 A | 1/1980 | Gonzalez | |
| 4,207,454 A | 6/1980 | Safonnikov et al. | |
| 4,213,117 A | 7/1980 | Kembo et al. | |
| 4,214,145 A | 7/1980 | Zvanut et al. | |
| 4,246,463 A | 1/1981 | Shutt et al. | |
| 4,314,136 A | 2/1982 | Kotecki | |
| 4,319,124 A | 3/1982 | Johansson | |
| 4,341,944 A * | 7/1982 | Breen | 219/123 |
| 4,355,224 A | 10/1982 | Mesick et al. | |
| 4,366,364 A | 12/1982 | Arai et al. | |
| 4,376,881 A | 3/1983 | Safonnikov et al. | |
| 4,427,874 A | 1/1984 | Tabata et al. | |
| 4,449,031 A | 5/1984 | Kotecki | |
| 4,454,406 A | 6/1984 | Safonnikov et al. | |
| 4,465,921 A | 8/1984 | Sakai et al. | |
| 4,510,374 A | 4/1985 | Kobayashi et al. | |
| 4,512,822 A | 4/1985 | Barringer et al. | |
| 4,551,610 A | 11/1985 | Amata | |
| 4,557,768 A | 12/1985 | Barringer et al. | |
| 4,571,480 A | 2/1986 | Sakai et al. | |
| 4,683,011 A | 7/1987 | Weaver et al. | |
| 4,689,461 A | 8/1987 | Gamberg | |
| 4,717,536 A | 1/1988 | Chai | |
| 4,717,807 A | 1/1988 | Parks | |
| 4,723,061 A | 2/1988 | Munz | |
| 4,794,232 A | 12/1988 | Kimbrough et al. | |
| 4,800,131 A | 1/1989 | Marshall et al. | |
| 4,803,340 A | 2/1989 | Sato et al. | |
| 4,833,296 A | 5/1989 | Crockett | |
| 4,866,247 A | 9/1989 | Parks | |
| 4,889,969 A | 12/1989 | Kawai et al. | |
| 4,948,936 A | 8/1990 | Landry | |
| 4,954,691 A | 9/1990 | Parks | |
| 4,999,479 A | 3/1991 | Paton et al. | |
| 5,003,155 A | 3/1991 | Chai | |
| 5,015,823 A | 5/1991 | Crockett | |
| 5,055,655 A | 10/1991 | Chai | |
| 5,091,628 A | 2/1992 | Chai | |
| 5,120,931 A | 6/1992 | Kotecki | |
| 5,124,529 A | 6/1992 | Nishikawa et al. | |
| 5,124,530 A | 6/1992 | O'Donnell et al. | |
| 5,132,514 A | 7/1992 | Chai | |
| 5,220,151 A | 6/1993 | Terayama | |
| 5,220,551 A | 6/1993 | Tateishi | |
| 5,225,660 A | 7/1993 | Mita et al. | |
| 5,225,661 A | 7/1993 | Chai | |
| 5,233,160 A | 8/1993 | Gordish | |
| 5,278,390 A | 1/1994 | Blankenship | |
| 5,281,791 A | 1/1994 | Tabata et al. | |
| 5,304,346 A | 4/1994 | O'Donnell et al. | |
| 5,308,698 A | 5/1994 | Bishel et al. | |
| 5,313,039 A | 5/1994 | Harvey et al. | |
| 5,349,159 A | 9/1994 | Mita | |
| 5,365,036 A | 11/1994 | Crockett | |
| 5,369,244 A | 11/1994 | Kulikowski | |
| 5,676,857 A | 10/1997 | Parker | |
| 5,742,029 A | 4/1998 | Stava | |
| 5,861,605 A | 1/1999 | Ogawa et al. | |
| 5,914,061 A | 6/1999 | Ogawa et al. | |
| 5,961,863 A | 10/1999 | Stava | |
| 5,981,906 A | 11/1999 | Parker | |
| 5,990,445 A | 11/1999 | Ogasawara et al. | |
| 6,051,810 A | 4/2000 | Stava | |
| 6,091,048 A | 7/2000 | Lanouette et al. | |
| 6,093,906 A | 7/2000 | Nicholson | |
| 6,111,216 A | 8/2000 | Stava | |
| 6,114,656 A * | 9/2000 | Fairchild | 219/137 WM |
| 6,124,569 A | 9/2000 | Bonnet et al. | |
| 6,160,241 A | 12/2000 | Stava | |
| 6,172,333 B1 | 1/2001 | Stava | |
| 6,204,478 B1 | 3/2001 | Nicholson | |
| 6,207,929 B1 | 3/2001 | Stava | |
| 6,215,100 B1 | 4/2001 | Stava | |
| 6,267,291 B1 | 7/2001 | Blankenship et al. | |
| 6,291,798 B1 | 9/2001 | Stava | |
| 6,300,596 B1 | 10/2001 | Bonnet et al. | |
| 6,337,144 B1 | 1/2002 | Shimizu et al. | |
| 6,339,209 B1 | 1/2002 | Kotecki | |
| 6,340,396 B1 | 1/2002 | Ogawa et al. | |
| 6,365,874 B1 | 4/2002 | Stava | |
| 6,384,376 B1 | 5/2002 | Plottier et al. | |
| 6,441,334 B1 | 8/2002 | Aida et al. | |
| 6,472,634 B1 | 10/2002 | Houston | |
| 6,501,049 B2 | 12/2002 | Stava | |
| 6,515,259 B1 | 2/2003 | Hsu | |
| 6,521,867 B2 | 2/2003 | Bonnet et al. | |
| 6,573,476 B2 | 6/2003 | Kim et al. | |
| 6,600,135 B2 | 7/2003 | Tong | |
| 6,617,549 B2 | 9/2003 | Ihde | |
| 6,649,872 B2 | 11/2003 | Kato et al. | |
| 6,713,723 B2 | 3/2004 | Lee | |
| 6,717,107 B1 | 4/2004 | Hsu | |
| 6,723,954 B2 | 4/2004 | Nikodym | |
| 6,723,957 B2 | 4/2004 | Holverson | |
| 6,784,401 B2 | 8/2004 | North et al. | |
| 6,841,246 B2 | 1/2005 | Shimizu et al. | |
| 6,855,913 B2 | 2/2005 | Nikodym | |
| 6,872,914 B2 | 3/2005 | Hsu | |
| 7,053,334 B2 | 5/2006 | Stava | |
| 7,064,290 B2 | 6/2006 | Blankenship | |
| 7,087,860 B2 | 8/2006 | Nikodym | |
| 7,091,446 B2 | 8/2006 | Houston | |
| 7,145,101 B2 | 12/2006 | Tong | |
| 7,166,817 B2 | 1/2007 | Stava et al. | |
| 7,271,365 B2 | 9/2007 | Stava et al. | |
| 2001/0023863 A1 | 9/2001 | Bonnet et al. | |
| 2002/0030043 A1 | 3/2002 | Tong | |
| 2002/0037420 A1 | 3/2002 | Shimizu et al. | |
| 2002/0043307 A1 | 4/2002 | Ishida et al. | |
| 2002/0060212 A1 | 5/2002 | Kim et al. | |
| 2003/0094444 A1 | 5/2003 | Kato et al. | |
| 2003/0116234 A1 | 6/2003 | Santella et al. | |
| 2003/0116548 A1 | 6/2003 | Blankenship | |
| 2003/0116550 A1 | 6/2003 | Lee | |
| 2003/0183609 A1 | 10/2003 | Holverson et al. | |
| 2004/0020912 A1 | 2/2004 | Hara et al. | |

(56) References Cited

U.S. PATENT DOCUMENTS

| | | |
|---|---|---|
| 2004/0187961 A1 | 9/2004 | Crockett |
| 2004/0188407 A1 | 9/2004 | Nikodym |
| 2004/0256370 A1 | 12/2004 | Keegan |
| 2005/0051524 A1 | 3/2005 | Blankenship |
| 2005/0127054 A1 | 6/2005 | Houston |
| 2006/0070983 A1 | 4/2006 | Narayanan et al. |
| 2006/0219684 A1 | 10/2006 | Katiyar |
| 2006/0226131 A1 | 10/2006 | Stava |
| 2006/0283848 A1 | 12/2006 | Karogal et al. |
| 2007/0095807 A1 | 5/2007 | Myers |

FOREIGN PATENT DOCUMENTS

| | | | |
|---|---|---|---|
| EP | 0 231 570 A2 | 8/1987 | |
| EP | 0 231 570 B1 | 10/1991 | |
| EP | 1 595 634 A | 11/1995 | |
| EP | 0 774 317 B1 | 5/1997 | |
| EP | 0 873 810 A1 | 10/1998 | |
| EP | 1 004 389 A1 | 5/2000 | |
| EP | 1 036 627 A2 | 9/2000 | |
| GB | 1 297 865 A | 11/1972 | |
| GB | 1 397 685 A | 6/1975 | |
| GB | 2 020 591 A | 11/1979 | |
| GB | 2 155 045 A | 9/1985 | |
| JP | 53-67657 A | 6/1978 | |
| JP | 57-064492 A | 4/1982 | |
| JP | 05-228691 A | 9/1993 | |
| JP | 05-237693 A | 9/1993 | |
| JP | 06-023547 A | 2/1994 | |
| JP | 2553915 B | 11/1996 | |
| JP | 9-38772 * | 2/1997 | |
| JP | 09-038772 | 2/1997 | |
| JP | 09038772 A * | 2/1997 | ............. B23K 9/073 |
| JP | 10-166145 A | 6/1998 | |
| JP | 2000-126893 A | 5/2000 | |
| JP | 2000-288730 A | 10/2000 | |
| JP | 2000-301382 A | 10/2000 | |
| RU | 2049621 C1 | 12/1995 | |
| RU | 1826338 A1 | 8/1996 | |
| RU | 2 217 275 C2 | 11/2003 | |
| RU | 2217275 C2 | 11/2003 | |
| WO | WO 98/22247 A1 | 5/1998 | |

OTHER PUBLICATIONS

European Search Report, application No. EP 05 00 8352, The Hague, Sep. 1, 2005, D. Herbreteau.

European Search Report, EP 05 00 8534, Munich, Jan. 30, 2006, J-S Cauber.

European Search Report, EP 06 11 7981, Munich, Sep. 25, 2007, Tom De Backer.

Translation of Russian Office Action for appln No. 2006127189/02 (029545).

A.I. Akoulov, M. "Welding in mechanical engineering" book of references, vol. 2, ed., Machinostroyeniye publishers, 1978, /D/, pp. 89, 90.

H. G. Hillenbrand, C.J. Heckmann and K.A. Niederhoff; "X80 line pipe for large-diameter high strength pipelines", Europipe GmbH; Mannesmann Forschungsinstitut GmbH; APIA 2002 Annual Conference, X80 Pipeline Workshop; Oct. 27-30, 2002, Hobart Australia.

"Welding liquid natural gas tanks and vessels n 5% and 9% nickel steels", ESAB AB, XA00099220.

Kruzic, R., "LNG storage tanks: advancements in weld inspections", Hydrocarbon Processing, Jul. 2004, pp. 53-55.

English translation of Russian Office Action, 2006138266/(041676), Oct. 30, 2006.

English Translation of Taiwan Office Action, Dec. 14, 2007.

* cited by examiner

GAS-LESS PROCESS AND SYSTEM FOR GIRTH WELDING IN HIGH STRENGTH APPLICATIONS

PRIORITY

The present application is a continuation-in-part of U.S. application Ser. No. 10/834,141, filed Apr. 29, 2004; now U.S. Pat. No. 7,166,817 a continuation-in-part of U.S. application Ser. No. 10/959,587, filed Oct. 6, 2004; a continuation-in-part of U.S. application Ser. No. 11/263,064, filed Oct. 31, 2005; and a continuation-in-part of U.S. application Ser. No. 11/336,506, filed Jan. 20, 2006, the entire disclosures of which are incorporated herein by reference.

FIELD OF THE INVENTION

The present invention relates to the art of electric arc welding and more particularly to an improved short arc welding system, methods of welding with self-shielded flux cored arc welding (FCAW-S) electrodes, and the composition of the electrodes.

BACKGROUND

Presently, there are no commercial solutions or methods for semi-automatically, circumferentially, welding high strength pipes and pipelines with a gas-less or self-shielding welding process. This is because the traditional technologies used for gas-less or self-shielding welding applications have inherent limitations in high strength welding applications.

In using gas-less or self-shielding welding electrodes various chemicals are used in the electrode to react with the oxygen and nitrogen in the atmosphere to keep these components out of the weld. These chemicals are used in such a quantity so as to sufficiently prevent the oxygen or nitrogen from deteriorating the weld quality. However, while these chemicals, such as titanium and aluminum, make the welds stronger, they also have the adverse effects of making the welds brittle. This brittleness prevents gas-less or self-shielding welding methods from being used in many high strength welding applications, such as pipeline welding, in which it is often required that the weld strength be sufficient to satisfy the requirements for welding American Petroleum Institute (API) Grade X-80 line pipe, or higher.

Further, although there exists methods for meeting these weld requirements using gas-shielded welding methods, these methods also have drawbacks which make them less than desirable. Namely, current methods and systems for welding high strength pipes and pipelines (along with other applications) using gas-shielding methods require costly and time consuming set ups to protect the welding area from the atmosphere and elements. This is particularly the case in pipeline applications, where the welds are often taking place outside in difficult environmental conditions.

INCORPORATION BY REFERENCE

The present invention involves using a short arc welding process employing a self-shielding cored electrode which is capable of satisfying the requirements for welding American Petroleum Institute (API) Grade X-80 line pipe, or higher. There is a synergistic relationship when combining the welding process and the flux cored electrode of the present invention. Thus, the present invention combines controlling the energy input along with the microstructure control of the weld metal deposited to achieve high-strength and toughness. Specifically, an exemplary embodiment of the present invention can achieve over 550 MPa yield strength and 690 MPa tensile strength, and a Charpy V-Notch (CVN) toughness of over 60 Joules at −20 degrees C.

Short-circuit arc welding systems, techniques, and associated concepts, as well as pipe welding methods and apparatuses are generally set forth in the following United States patents, the contents of which are hereby incorporated by reference as background information: Parks U.S. Pat. No. 4,717,807; Parks U.S. Pat. No. 4,954,691; Parker U.S. Pat. No. 5,676,857; Stava U.S. Pat. No. 5,742,029; Stava U.S. Pat. No. 5,961,863; Parker U.S. Pat. No. 5,981,906; Nicholson U.S. Pat. No. 6,093,906; Stava U.S. Pat. No. 6,160,241; Stava U.S. Pat. No. 6,172,333; Nicholson U.S. Pat. No. 6,204,478; Stava U.S. Pat. No. 6,215,100; Houston U.S. Pat. No. 6,472,634; and Stava U.S. Pat. No. 6,501,049.

The electric arc welding field uses a variety of welding processes between the end of a consumable advancing electrode and a workpiece which workpiece may include two or more components to be welded together. An embodiment of the present invention relates to the short arc process where the advancing electrode is melted by the heat of the arc during a current pulse and then, after the molten metal forms into a ball by surface tension action, the molten metal ball is transferred to the workpiece by a short circuit action. The short circuit occurs when the advancing wire moves the ball into contact with the molten metal puddle on the workpiece, which short is sensed by a plunge in the welding voltage. Thereafter, the short circuit is broken and the short arc welding process is repeated. The present invention is an improvement in short arc welding and is performed by using a power source where the profile of the welding waveform is controlled by a waveform generator operating a pulse width modulator of a high switching speed inverter, as disclosed in several patents by assignee, such as shown in Parks U.S. Pat. No. 4,866,247; Blankenship U.S. Pat. No. 5,278,390; and, Houston U.S. Pat. No. 6,472,634, each of which is hereby incorporated by reference. These three patents illustrate the type of high switching speed power source employed for practicing an exemplary embodiment of the present invention and are incorporated herein as background technology. A waveform of the waveform generator is stored in memory as a state table, which table is selected and outputted to the waveform generator in accordance with standard technology pioneered by The Lincoln Electric Company of Cleveland, Ohio. Such selection of a table for creating the waveform profile in the waveform generator is disclosed in several prior art patents, such as the previously mentioned Blankenship U.S. Pat. No. 5,278,390. Consequently, a power source used in practicing the present invention is now commonly known and constitutes background technology used in the present invention. An aspect of the short arc welding system of the present Invention employs a circuit to determine the total energy of the melting pulse forming the molten metal ball of the advancing electrode, such as described in Parks U.S. Pat. No. 4,866,247. The total energy of the melting pulse is sensed by a watt meter having an integrated output over the time of the melting pulse. This technology is incorporated by reference herein since it is employed in one aspect of the present invention. After a short has been created in a short arc welding system, the short is cleared by a subsequent increase in the welding current. Such procedure is well known in short arc welding systems and is described generally in Ihde U.S. Pat. No. 6,617,549 and in Parks U.S. Pat. No. 4,866,247. Consequently, the technology described in Ihde U.S. Pat. No. 6,617,549 is also incorporated herein as background technology. An exemplary embodiment of the present invention is a modification of a standard AC pulse welding system known in the welding industry. A prior pending application of assignee describes standard pulse welding, both DC and AC, with an energy measurement circuit or program for a high frequency switching power source of the type used in practicing an exemplary AC short circuit implementation of the present invention. Although not necessary for understanding the present invention or practicing the present invention, this prior application, which is Ser. No. 11/103,040 filed Apr. 11, 2005, is incorporated by reference herein.

The present invention relates to a cored electrode and a short arc welding system, and method, for controlling the melting pulse of the system for depositing a special cored electrode so no shielding gas is needed, which is capable of satisfying the requirements for welding American Petroleum Institute (API) Grade X-80 line pipe, or higher. The system and method maintains a desired time between the pulse and the actual short circuit. This time is controlled by a feedback loop involving a desired timing of the short circuit and the pulse, so that the size of the ball of the pulse is varied to maintain a consistent short circuit timing. This process is a substantial improvement of other short arc control arrangements, such as disclosed in Pijls U.S. Pat. No. 4,020,320 using two power sources. A first source maintains a constant size melting pulse and there is a fixed time between the short circuit and the subsequent clearing pulse. There is no feedback between the pulsed timing and a parameter of the melting pulse, as employed in the present invention. A desired time is maintained between the end of the melting pulse and the short circuit event. By fixing the desired time using a feedback loop concept, arc stability is improved. This invention is applicable to a DC process, as shown in Pijls U.S. Pat. No. 4,020,320, but is primarily advantageous when using an AC short arc welding system. Consequently, Pijls U.S. Pat. No. 4,020,320 is incorporated by reference herein as background technology showing a control circuit for a DC short arc system wherein two unrelated timings are maintained constant without a closed loop control of the melting pulse.

The present invention further involves a welding method employing a flux cored, i.e. self-shielding, electrode or welding wire. Details of arc welding electrodes or wires and specifically, cored electrodes for welding are provided in U.S. Pat. Nos. 5,369,244; 5,365,036; 5,233,160; 5,225,661; 5,132, 514; 5,120,931; 5,091,628; 5,055,655; 5,015,823; 5,003,155; 4,833,296; 4,723,061; 4,717,536; 4,551,610; and 4,186,293; all of which are hereby incorporated by reference.

Also, prior applications filed Sep. 8, 2003 as Ser. No. 10/655,685; filed Apr. 29, 2004 as Ser. No. 10/834,141; filed Oct. 6, 2004 as Ser. No. 10/959,587; and filed Oct. 31, 2005 as Ser. No. 11/263,064 are each incorporated by reference as background, non-prior art technology.

SUMMARY OF THE PRESENT INVENTION

The present invention is directed to a system and method for addressing the problems discussed above and providing a system and method which is capable of creating a weld which satisfies the requirements for welding American Petroleum Institute (API) Grade X-80 line pipe, or higher. Specifically, an exemplary embodiment of the present invention can achieve over 550 MPa yield strength and 690 MPa tensile strength, and a Charpy V-Notch (CVN) toughness of over 60 Joules at −20 degrees C.

The system and method of the present invention controls the welding arc through a specialized power source to minimize the arc length coupled with the use of a cored, i.e. self-shielded, electrode to achieve the desired welding attributes. The use of the short arc minimizes the contamination from the atmosphere in the weld pool, thus improving toughness, while at the same time being more resistant to porosity during welding. Further, the use of the short arc length allows for the use of a self-shielding electrode, according to an embodiment of the present invention, which contains a composition according to an aspect of the present invention, discussed further below. Additionally, with the present invention, there is no need to use additional shielding gas to achieve a weld which satisfies the requirements for welding American Petroleum Institute (API) Grade X-80 line pipe, or higher, and/or over 550 MPa yield strength and 690 MPa tensile strength, and a Charpy V-Notch (CVN) toughness of over 60 Joules at −20 degrees C.

In accordance with a first aspect of the present invention as it relates to the method, the melting pulse of the short arc waveform is controlled interactively by a feedback loop and not by fixing constant values of the melting pulse. The time between the end of the melting pulse and the short circuit is maintained by reactively changing parameters of the melting pulse in a short arc welding system. In one exemplary embodiment of the invention the system is an AC system, but can be used in a DC system of the type generally described in Pijls U.S. Pat. No. 4,020,320. Manipulation of the short arc waveform is facilitated by using a single power source having the waveform controlled by a waveform generator operating the pulse width modulator of a high switching speed inverter, such as disclosed in Houston U.S. Pat. No. 6,472,634. One advantage realized by implementation of the present invention is an improvement over short arc welding using two separate power sources, as shown in the prior art.

In accordance with another embodiment of the first aspect of the present invention, the short arc welding system is an AC system wherein the melting pulse has a negative polarity. To maintain a constant molten metal bead, there is a joule threshold switch to shift the power supply to a low level positive current so the molten metal on the end of the advancing electrode forms into a ball and then short circuits against the workpiece weld puddle. In an embodiment, this AC waveform is controlled by a waveform generator controlling the profile of the individual current segments of the waveform and determining the polarity of the waveform segments. In the prior art, a joule threshold switch was used to provide a constant energy to the melting pulse. In accordance with an embodiment of the present invention, there is a timer to measure the time for the electrode to short after the melting pulse. A feedback loop is employed to maintain a consistent time between the melting pulse and the short circuit event. This control of time stabilizes the arc and the shorting cycle. In one embodiment of the present inventions the time between the melting pulse and the short is about 1.0 ms. Depending upon the electrode size and deposition rate, the time between the melting pulse and the short circuit event may be adjusted to a fixed value in the general range of 0.5 ms to 2.0 ms. Control of the timing is typically applicable to AC short arc welding; however, the same concept is applicable to straight DC positive polarity. In both instances, the advancing wire with molten metal formed by the melting pulse is held at a low quiescent positive current facilitating the formation of a ball preparatory to the short circuit event. In either implementation of the invention, the joules or other parameter of the melting pulse is controlled by a feedback loop conditioned to maintain a preset time to the short circuit event.

The AC implementation of the first aspect of the present invention is useful for tubular electrodes of the flux cored type and one embodiment is implimented with a flux core electrode with alloy ingredients in the core according to an aspect of the present invention, discussed further below. Control of the melting cycle of a flux cored electrode based upon feedback from the short circuit time is a very precise procedure to maintain stability of the AC short circuit welding process. In view of the foregoing, an embodiment the present invention may be used to weld pipe with a cored, i.e. self-shielding, electrode according to an embodiment of the present invention. The welding current for such electrode, when using a method of the present invention, is below the threshold current for spray welding. Thus, the metal transfer to the pipe joint must involve some type of short circuit, and in an embodiment of the present invention will involve a globular short circuit transfer of the type to which the present invention is directed. Improving the weld stability by using AC short arc welding still may result in instability of the arc. This instability has been overcome by implementing the present invention. Thus, the present invention is particularly applicable to AC short arc welding of a pipe joint using a self-shielding cored electrode, so that the weld strength satisfies the requirements for welding American Petroleum Institute (API) Grade X-80 line pipe, or higher.

In accordance with an embodiment of the present invention, there is provided a welding system for performing a short arc welding process between an advancing wire electrode and a workpiece, where the system comprises a power source with a controller for creating a current pulse introducing energy into the electrode to melt the end of the electrode and a low current quiescent metal transfer section allowing the melted metal on the end of the electrode to be deposited into the weld puddle of the workpiece. During the low current metal transfer section, the molten metal short circuits against the molten metal puddle. A timer measures the actual time between the end of the melting pulse and the short circuit event. A device is used to set a desired time between the pulse and short circuit event and a circuit is used to create a corrective signal based upon the difference between the actual time and the desired time. This corrective signal is used to control a given parameter of the melting pulse, such as the total energy introduced into the wire during the melting pulse.

In accordance with an exemplary embodiment of the first aspect of the present invention, the short arc welding process is an AC process wherein the melting pulse is performed with a negative current and the quiescent low current metal transfer section of the waveform is at a positive polarity. The AC version of the present invention is applicable for welding with a flux cored electrode in several environments, such as the root pass of a pipe welding joint.

In accordance with another aspect of the power source of the present invention, the controller of the short arc welding system includes a circuit to create a short circuit clearing pulse after the short circuit. In this embodiment of the power source a waveform generator determines the polarity and profile of the welding waveform at any given time. The welding system of the present invention is used to maintain the time between the melting pulse and the short at a fixed value, which fixed value is in the general range 0.5-2.0 ms and, in another embodiment is approximately 1.0 ms.

In accordance with another aspect of the power source or method performed by the power source, the short arc system is performed DC positive with both the melting pulse and the quiescent section being positive and followed by a short circuit positive clearing pulse. This implementation of the present invention does not involve a polarity change from the waveform generator during the processing of the waveform to practice the short arc welding process. The short arc welding system is AC and there is a circuit to control the current pulse for causing the actual time between the melting pulse and short circuit so it is the same as the desired time. This embodiment of the present invention maintains a constant time, as does other embodiments of the present invention.

One embodiment of the present invention controls the energy of the melting pulse to control the time between the melting pulse and the ultimate short circuit event.

Yet another aspect of the first aspect of the invention is the provision of a method for controlling the melting pulse of a short arc welding process so that the process has a selected time between the melting pulse and the short circuit event. The parameter controlled by this method is the total energy of the melting pulse. This embodiment of the present invention may be used in the root pass of a circular open root pipe joint using a flux cored electrode.

A second aspect of the invention relates at least in part, to utilizing a relatively short arc length during AC welding as obtained by the described short arc method, which results in contamination of the weld from the atmosphere being significantly reduced. This embodiment of the invention also utilizes a particular flux alloy system, which when used in an electrode along with this aspect of the invention, can achieve beneficial results. The flux/alloy system of the cored electrode enables and promotes a short arc length. Combining these aspects in accordance with an embodiment of the present invention, provides a synergistic phenomenon which produces a sound and tough weld metal with strength of over 60 to 70 ksi, and in another embodiment have a yield strength of at least 80 ksi, thus providing a weld which satisfies the requirements for welding American Petroleum Institute (API) Grade X-80 line pipe, or higher. Further, an exemplary embodiment of the present invention can achieve over 550 MPa yield strength and 690 MPa tensile strength, and a Charpy V-Notch (CVN) toughness of over 60 Joules at −20 degrees C. Moreover, alloys, as used in embodiments of the present invention, allow use of thinner pipes and there is no need for shielding gas in the pipe welding area.

Waveform technology, as pioneered by The Lincoln Electric Company of Cleveland, Ohio, has been modified for use in AC welding with flux cored electrodes. Cored electrodes allow the welding operation to be more precisely controlled with the alloy of the weld bead being tailored to the desired mechanical characteristics for the bead and with the position of the welding operation being less limited. However, to provide arc stability and appropriate melting temperatures and rates, the actual control of the waveform for the AC process is quite complicated. Contamination of the weld metal during arc welding is still a problem using AC welding for cored electrodes. Contaminants, in the weld metal after the welding operation can cause porosity, cracking and other types of defects in the weld metal. Consequently, a major challenge confronting designers of arc welding processes has been to develop techniques for excluding elements, such as contaminants from the atmosphere, from the arc environment or for neutralizing the potentially harmful effects of such impurities. The potential source of contamination, includes the materials that comprise the welding electrode, impurities in the workpiece itself and ambient atmosphere. Cored electrodes may contain "killing" agents, such as aluminum, magnesium, zirconium and titanium which agents combine chemically with potential contaminates to prevent them from forming porosity and harmful inclusion in the weld metal. The present invention involves the use of an electrode composition that reduces the tendency of a cored electrode to allow inclusion of contaminants in the weld metal. The method also reduces the amount of material required as a "killing" agent.

Specifically, the present invention provides a self-shielded flux cored arc welding (FCAW-S) electrode particularly adapted for forming welds having reduced levels of contaminants using an AC waveform. The electrode has an alloy/flux system comprising from about 35 to about 55% barium fluoride, from about 2 to about 12% lithium fluoride, from about 0 to about 15% lithium oxide, from about 0 to about 15% barium oxide, from about 5 to about 20% iron oxide, and up to about 25% of a deoxidation and denitriding agent. This agent can be selected from aluminum, magnesium, titanium, zirconium, and combinations thereof.

The present invention provides a method of arc welding using a self-shielded flux cored electrode that utilizes a particular alloy/flux system. The method comprises applying a first negative voltage between an electrode and a substrate to cause at least partial melting of the electrode proximate the substrate. The method also comprises applying a positive voltage between the electrode and the substrate to promote formation of a flowable mass of material from the electrode. The method further comprises monitoring for occurrence of an electrical short between the electrode and the substrate through the flowable mass. The method further comprises upon detecting an electrical short, applying a second negative voltage between the electrode and the substrate. And, the method comprises increasing the magnitude of the second negative voltage, to thereby clear the electrical short and form a weld on the substrate from the flowable mass. The self-shielded flux cored electrode can comprise from about 35 to about 55% barium fluoride, from about 2 to about 12% lithium fluoride, from about 2 to about 15% lithium oxide, from about 5 to about 20% iron oxide, and up to about 25% of a deoxidation and denitriding agent selected from the group consisting of aluminum, magnesium, titanium, zirconium, and combinations thereof.

An object of the present invention is the provision of a short arc welding system, which system controls the spacing of the short circuit events during the process, especially when the process is performed in the AC mode, to provide a weld which satisfies the requirements for welding at least American Petroleum Institute (API) Grade X-80 line pipe.

Another object of the present invention is the provision of a method for short arc welding, which method controls the melting pulse based upon the time between the melting pulse and short so this time remains fixed at a desired value.

Yet another object of the present invention is the provision of an improved electrode composition, and particularly an electrode fill composition which is particularly adapted for use in combination with the novel short arc welding system and method.

A further object of the present invention is to provide a synergistic system comprising a short am process and flux cored electrode to stabilize the arc at the shortest possible are length. Thus, the contamination from the atmosphere is minimized. The combination of an alloy system and a weld process allows the arc to be stable at such short arc lengths and result in a sound and tough weld metal. One embodiment of the invention can provide a weld, without the use of gas-shielding, having a yield strength of at least 80 ksi, thus providing a weld which satisfies the requirements for welding American Petroleum Institute (API) Grade X-80 line pipe, or higher. Further, an exemplary embodiment of the present invention can achieve over 550 MPa yield strength and 690 MPa tensile strength, and a Charpy V-Notch (CVN) toughness of over 60 Joules at −20 degrees C.

These and other objects and advantages will become apparent from the following description taken together with the accompanying drawings.

BRIEF DESCRIPTION OF DRAWINGS

The advantages, nature and various additional features of the invention will appear more fully upon consideration of the illustrative embodiment of the invention which is schematically set forth in the figures, in which.

EXEMPLARY EMBODIMENTS OF THE INVENTION

Figures 1, 1A:
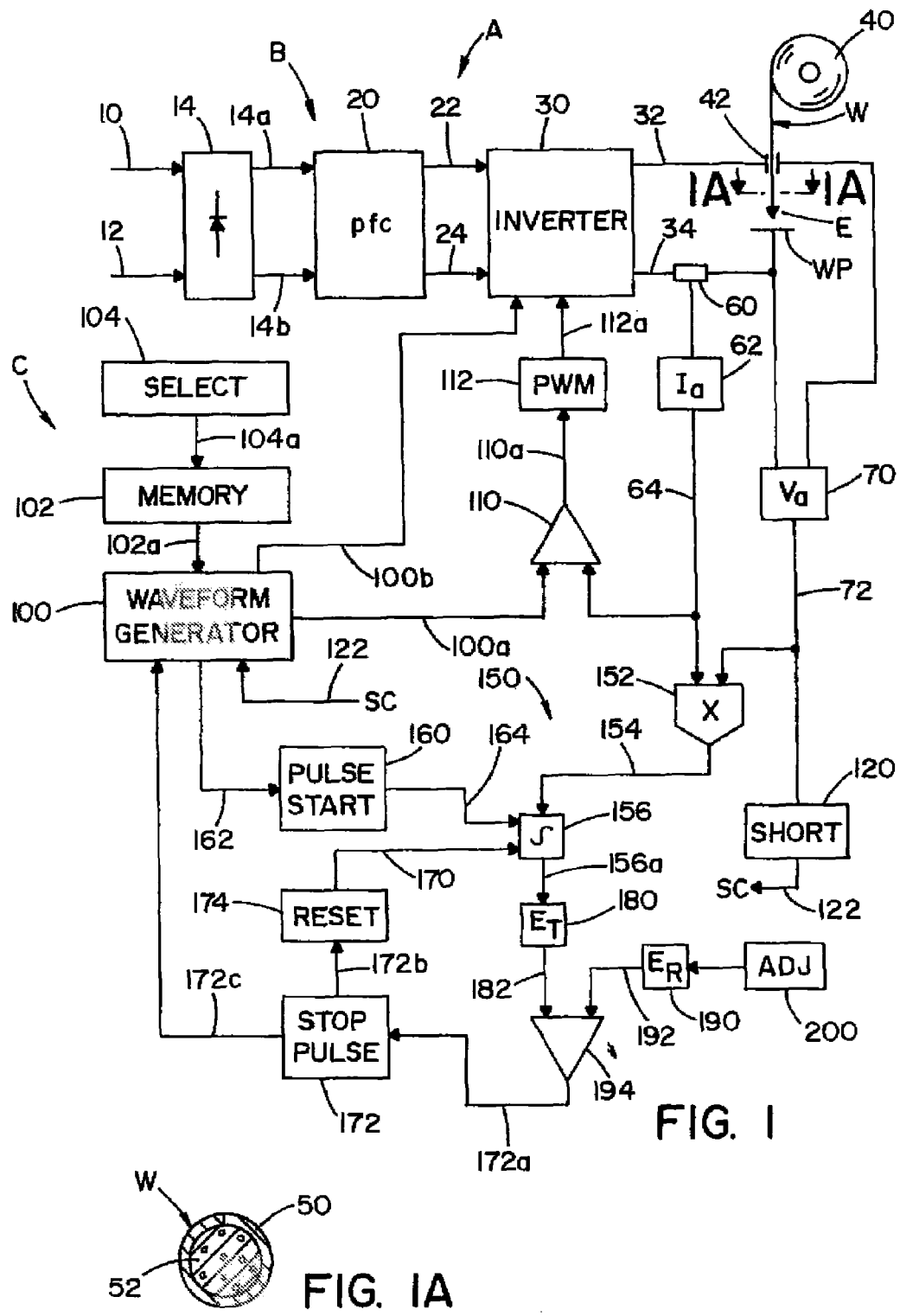
FIG. 1 is a block diagram of a short arc welding system used in an exemplary embodiment of the present invention.
FIG. 1A is an enlarged cross-sectional view taken generally along line 1A-1A of FIG. 1.
Figure 2:
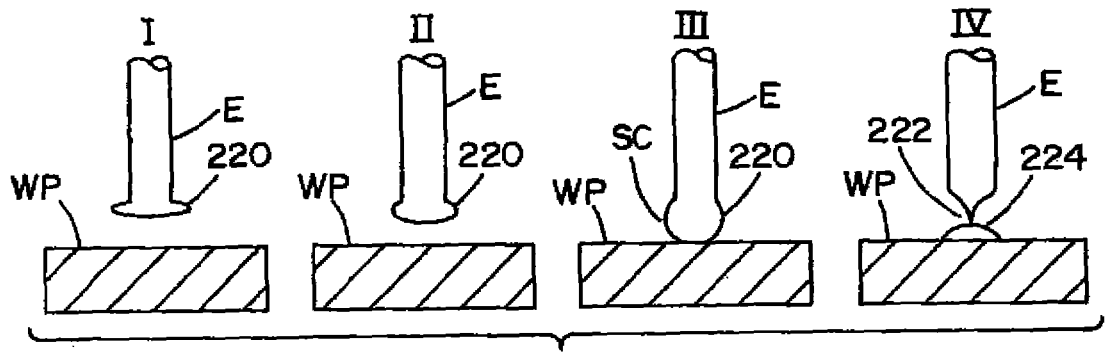
FIG. 2 is a series of side elevational views showing the stages I-IV in a short arc welding process.

In the electric arc welding industry, short arc welding is a common practice and involves the four stages I, II, III and IV as schematically disclosed in FIG. 2. The power source for performing short arc welding can be a transformer based power source; however, in accordance with an exemplary embodiment of the present invention, system A, shown in FIG. 1, utilizes a high switching speed inverter based power source B having an AC supply across lines 10, 14, or a three phase supply, directed to inverter 14 creating a first DC signal across lines 14a, 14b. In accordance with standard architecture, boost or buck converter 20 is used in power source B for correcting the input power factor by creating a controlled second DC signal across output lines 22, 24. High switching speed inverter 30 converts the second DC signal across lines 22, 24 to a waveform created by a large number of current pulses across output leads 32, 34. In accordance with an exemplary embodiment of the present invention, the waveform across leads 32, 34 is either DC positive or AC; therefore, inverter 30 has an output stage, not shown, that dictates the polarity of the profiled waveform across leads 32, 34. These leads are connected to electrode E and workpiece WP, respectively. In accordance with standard short arc technology, electrode E is an advancing end of wire W supplied through contact tip 42 from supply spool or drum 40. Thus, wire W is driven toward workpiece WP at a given WFS as a controlled waveform having the desired polarity is created across the gap between electrode E and workpiece WP. In an embodiment of the invention, the wire W is a flux cored wire schematically illustrated in FIG. 1A and shown to include an outer low carbon steel sheath 50 surrounding an internal flux core 52 having a fluxing agent and normally including alloying particles, also known as a self-shielded wire or electrode. An embodiment of the electrode will be discussed in more detail below.

Shunt 60 drives feedback current device 62 so the voltage signal on line 64 is representative of the instantaneous arc current of the welding process. In a like manner, device 70 creates a signal on output line 72 representative of the instantaneous voltage of the welding process. Controller C of inverter 30 is a digital device, such as a DSP or microprocessor, that performs functions schematically illustrated in generally analog architecture. As a central component of controller C a waveform generator 100 processes a specific waveform from a state table stored in memory unit 102 and selected according to the desired welding process by device or circuit 104. Upon selecting the desired short arc welding process a select signal 104a is directed to memory unit 102 so that the state table defining the attributes and parameters of the desired short arc welding waveform is loaded into waveform generator 100 as indicated by line 102a. Generator 100 outputs the profile of the waveform at any given time on output line 100a with the desired polarity indicated by the logic on line 100b. Illustrated power source B controlled by digital controller C is of the current control feedback type wherein the current representative voltage on line 64 is combined with the waveform profile signal on line 100a by error amplifier 110 having an output signal on line 110a to control pulse width modulator 112 in accordance with standard waveform control technology. The output signal on line 112a controls the shape of the waveform across lines 32, 34 and the polarity of the particular waveform profile being implemented is set by the logic on line 100b. In this manner, waveform generator 100 controls pulse width modulator 112 to have pulses in line 112a controlling the high frequency operation of inverter 30. This inverter switching frequency is generally greater than 18 kHz and preferably greater than about 40 kHz. As so far described, power source B with controller C operates in accordance with standard technology pioneered by The Lincoln Electric Company of Cleveland, Ohio. Controller C is digital, but illustrated in analog format. To implement a short arc welding process, it is necessary for controller C to receive feedback information regarding a short circuit condition between electrode E and workpiece WP. This feature of controller G is schematically illustrated as a short circuit detector 120 that creates a logic on line 122 to announce the existence of a short circuit event SC to waveform generator 100. Thus, the generator is informed when there is a short circuit and implements a waveform in accordance with processing a short circuit as accomplished in any short arc welding process. As so far described, controller C is standard technology, with the exception of controlling a polarity switch at the output of inverter 30 by the logic on line 100b.

To practice the invention, controller C is provided with a circuit 150 for controlling the melting pulse preparatory to the short circuit. Circuit 150 is digital, but schematically illustrated in analog architecture. The functions are implemented by the digital processor of controller C to control the energy of the melting pulse. Such energy control circuitry is described in prior copending application Ser. No. 11/103,040 filed by applicant on Apr. 11, 2005. This prior application is incorporated by reference herein not as prior art, but as related technology. As shown in the prior application, the energy of the melting pulse of a pulsed welding waveform can be controlled by circuit 150 including multiplier 152 for multiplying the instantaneous signal on lines 64, 72 to provide a signal on line 154 representing the instantaneous watts of the welding process. The wattage signal or line 154 is accumulated by a standard integrator 156 as described in Parks U.S. Pat. No. 4,866,247. Integration of the watt signal on line 154 is controlled by waveform generator 100 that creates a pulse start command shown as block 160 to correspond to the start of the melting pulse indicated by logic on line 162. The starting point is the time $t_1$ when the melting pulse is started by waveform generator 100. Output signal on line 164 starts integration of the watt signal on line 154 by integrator 156. The integration process is stopped by a logic on line 170 produced by activation of stop pulse device or circuit 172 upon receipt of logic on input line 172a. Logic on line 172a toggles device 172 to change the logic in output lines 172a and 172c. The logic on line 172c informs the Waveform generator that the melting pulse is to stop to change the profile on output line 100a. At the same time, the signal on line 172b toggles reset device or circuit 174 to change the logic on line 170 to stop integration of the instantaneous watt signal. The digital number on output line 156a is loaded into digital register 180 having an output 182 representing the total energy of a given melting pulse in the short art welding process. This total energy signal is compared with a desired energy level stored in register 190 to provide a digital number or signal on line 192. Comparator 194 compares the actual energy for a given pulse represented by a number on line 182 with a desired energy level indicated by the number on line 192. The relationship between the actual energy and the desired energy controls the logic on line 172a. When the signal from line 182 equals the signal on line 192, comparator 194 changes the logic on line 172a to stop the pulse as indicated by device or circuit 172. This stops integration and stops the melting pulse being created by waveform generator 100. Circuit 150 is employed for performing an exemplary embodiment of the present invention which changes the reference or desired energy for the melting pulse by changing the number on line 192 through adjustment of circuit 200. The pulse is stopped when the adjusted energy or energy threshold is reached as determined by the number signal on line 182 as compared to the signal on line 192. In an embodiment of the present invention, the power source and method used adjusts circuit 200 to change the reference energy for performing a short arc welding process by changing the melting pulse.

Figure 3:
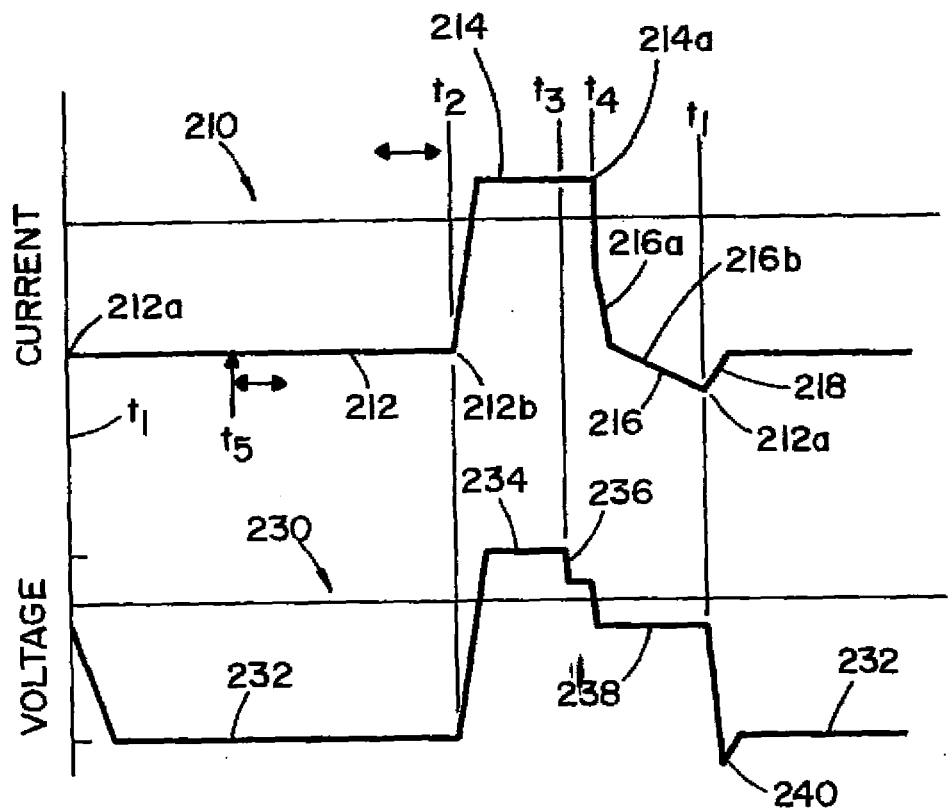
FIG. 3 is a combined current and voltage waveform graph showing the waveform implementing an embodiment of the present invention as disclosed in FIG. 4 for the various stages as shown in FIG. 2.

Short arc welding system A using power source B with digital controller C is operated by adjusting circuit 200 to perform the waveform shown in FIG. 3. AC current waveform 200 has a negative melting pulse 212 represented by stage I in FIG. 2 where the melting pulse produces molten metal 220 on the end of electrode E. The level of current in pulse 212 is below current needed for spray arc so there is a transfer by a short. The time $t_1$ starts the Joule measurement, as explained later. The pulse has a start position 212a at time $t_1$ and a stop position 212b at time $t_2$. Following the melting pulse, in accordance with standard practice, there is a positive low current quiescent transfer section 214, as represented by stage II of FIG. 2. In this stage, the molten metal 220 on the end of advancing electrode E is formed into a ball by surface tension action awaiting a short circuit which occurs at time $t_3$ and is shown as stage III. Consequently, the time between $t_2$ and $t_3$ is the time between the end of the melting pulse and the short circuit event, which time is indicated by the logic on line 122 as shown in FIG. 1. After stage II, a current pinch action shown as neck 222 separates the molten metal 220 from puddle 224. This electrical pinching action shown in stage IV is accelerated in accordance with standard practice by a negative short circuit pulse 216 having a first current section 216a with a steep slope and followed by a second current section 216b with a more gradual slope. Ultimately, the shorted metal separates and the SC logic on line 122 shifts to start the next current pulse at time $t_1$ indicated by a transition section 218. Waveform 210 is an AC waveform having a negative melting pulse 212, a low current quiescent section 214 and a clearance pulse 216 transitioning into the next negative pulse 212 at time $t_1$. The corresponding voltage has a waveform 230 with negative section 232, a low level positive section 234 that plunges at short 236 and is followed by a negative voltage section 238 that transitions at section 240 into the next melting pulse voltage 232. The total cycle time is from $t_1$ to the next $t_1$ and the positive transfer 214 has a time less than 20% of the total cycle time. This prevents stubbing.

The present invention involves a power source and method for controlling waveform 210 by waveform generator 100 of controller C so the time between the end of melting pulse 212 at $t_2$ and the time of the actual short event $t_3$ is constant based upon adjustment of circuit 200. This time delay adjustment, in an exemplary embodiment, is accomplished by the circuit 250 shown in FIG. 4. In this circuit, the time between the melting pulse and at time $t_2$ and the short circuit at time $t_3$ is set to a desired level between 0.5 to 2.0 ms. In one embodiment, the set desired time delay is 1.0 ms, which is the level of the signal on line 254. Thus, the numerical number on line 254 is the desired time $t_2$ to $t_3$. The actual time between $t_2$ and $t_3$ is determined by timer 260 which is started at time $t_2$ and stopped at time $t_3$. The timer is reset for the next measurement by an appropriate time indicated as $t_5$ which can be adjusted to be located at various positions after $t_3$, which position is illustrated to be during the melting pulse in FIG. 3. The number on line 262 is the actual time between $t_2$ and $t_3$. This actual time is stored in register 270 which is reset at any appropriate time such as time $t_2$. Thus, the digital data on line 272 is the actual measured time between $t_2$ and $t_3$. This time is compared to the desired time on line 254. Any error amplifier can be used to digitally process the relationship of actual time to the set time. The process is schematically illustrated as a summing junction 280 and digital filter 282 having an output 284 for adjusting circuit 200. The difference between the desired time and the actual time is an error signal in line 284 which increases or decreases the desired total energy of circuit 200. The desired total energy is periodically updated at an appropriate time indicated as $t_2$ by an update circuit 290. Thus, at all times the signal in line 192 of FIG. 1 is the desired total energy for pulse 212 of the short arc process. This total energy is adjusted by any difference between time $t_2$ and time $t_3$ so the energy of pulse 212 maintains a constant or desired time delay for the upcoming short circuit. This time control stabilizes the short arc welding process of system A.

Figure 4:
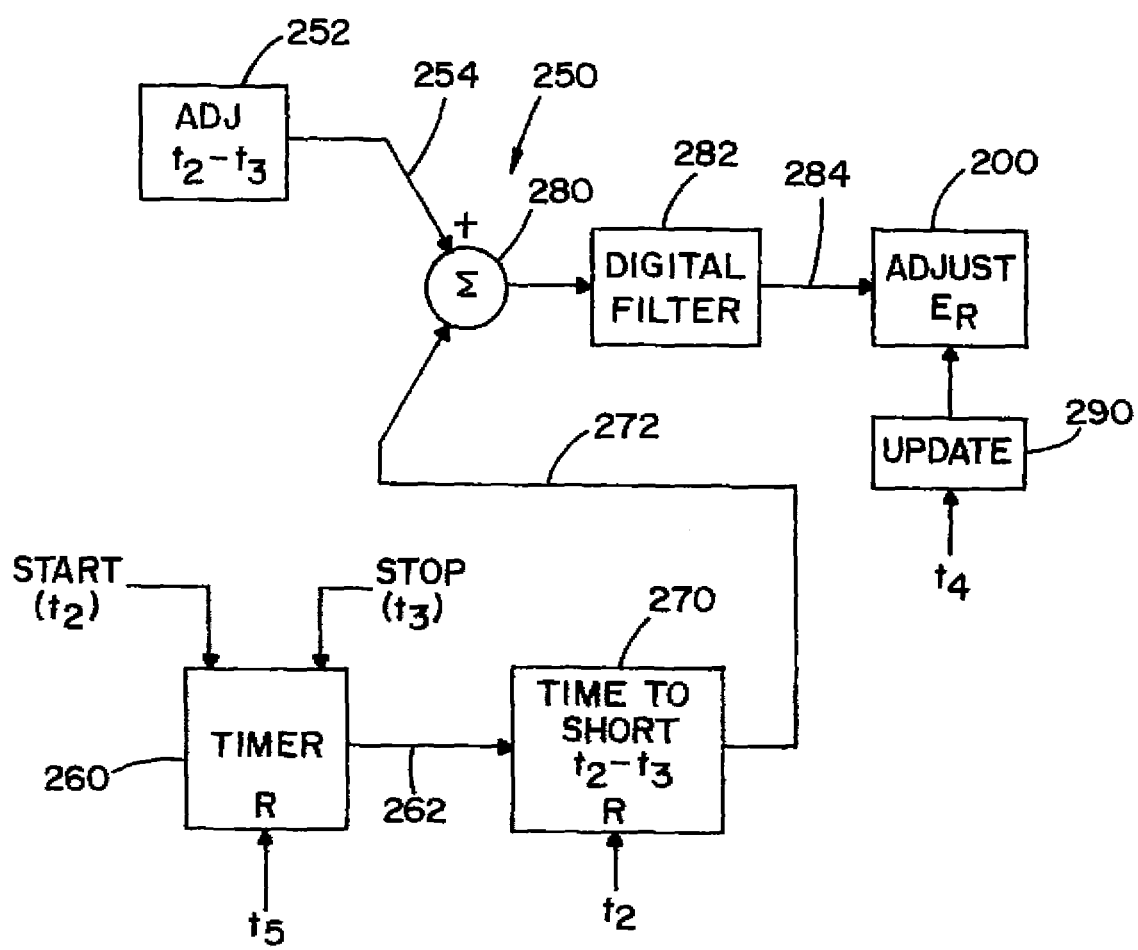
FIG. 4 is a flow chart block diagram illustrating a modification of the system in FIG. 1 to perform the embodiment of the present invention.
Figure 5:
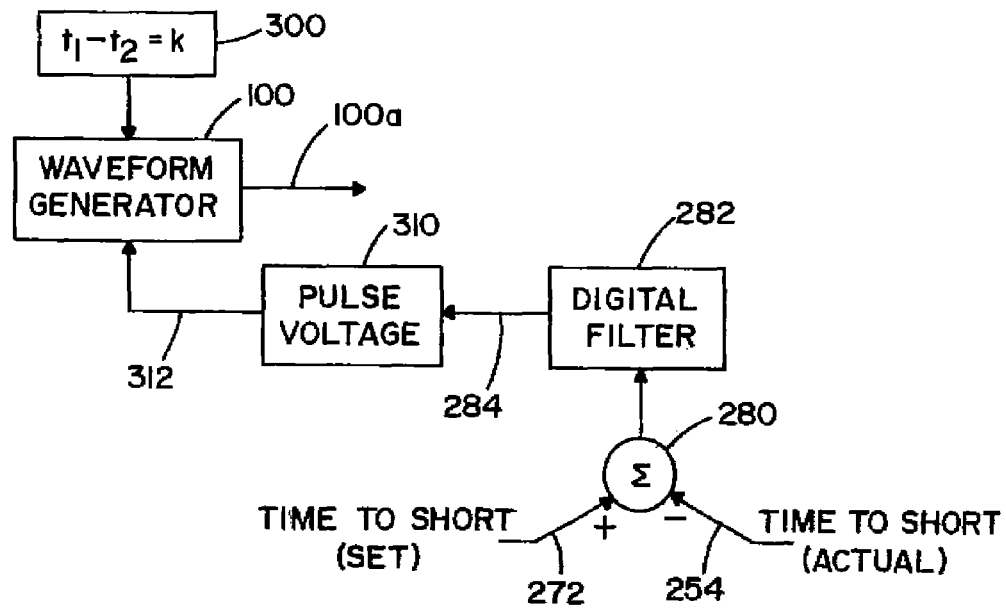
FIGS. 5 and 6 are flow chart block diagrams of a portion of the welding system shown in FIG. 1 for implementing two further embodiments of the present invention.
Figure 6:
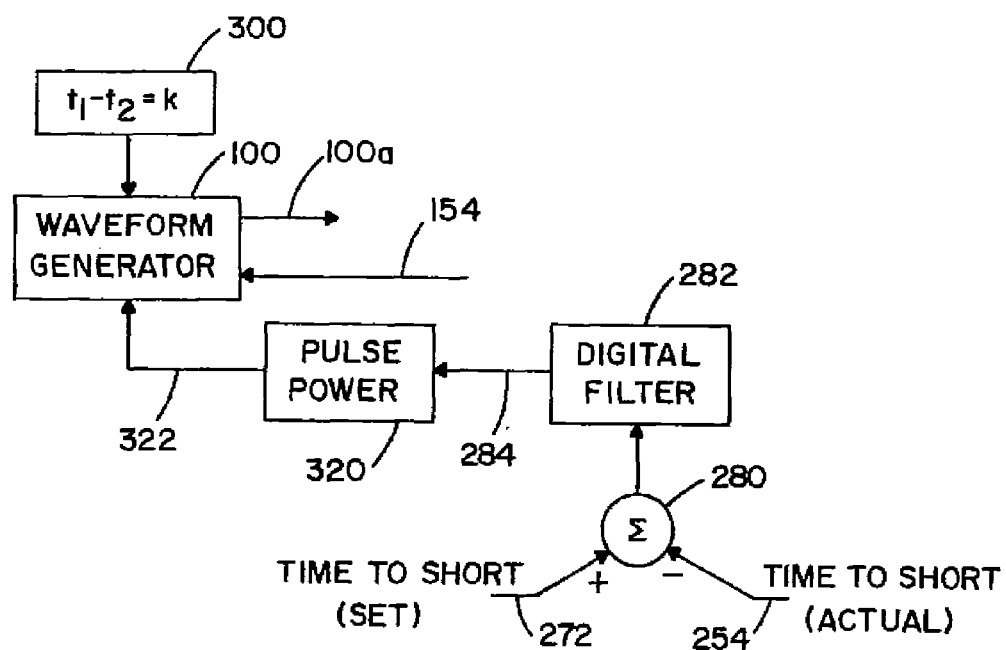

In FIG. 4, an exemplary embodiment of the power source is implemented by changing the energy threshold for the melting pulse to change the timing between the pulse and the short event. This time can also be changed by voltage or power of the melting pulse as schematically illustrated in FIGS. 5 and 6. In both of these embodiments, the time of the melting pulse $t_1$ to $t_2$ is maintained fixed as indicated by block 300. During this constant time melting pulse, the voltage or power is changed to control the time between the pulse and the short circuit event. In FIG. 5, the number on output line 284 from filter 282 controls feedback loop 310 to adjust the voltage of the melting pulse, as indicated by the numerical data on line 312. To adjust the power for controlling the delay time of the short circuit event, the number on output line 284 is used to adjust feedback loop 320, which is compared to the instantaneous power on line 154 by waveform generator 100. The change in power is a numerical value on line 322 which is compared to the digital number on line 154 for controlling the power of the melting pulse. Thus, in embodiments of the present invention, the total energy of the waveform, the voltage of the waveform or the power of the waveform is adjusted to maintain a constant time between $t_2$ to $t_3$ to stabilize the arc and control the short circuit events of system A shown in FIG. 1.

Figure 7:
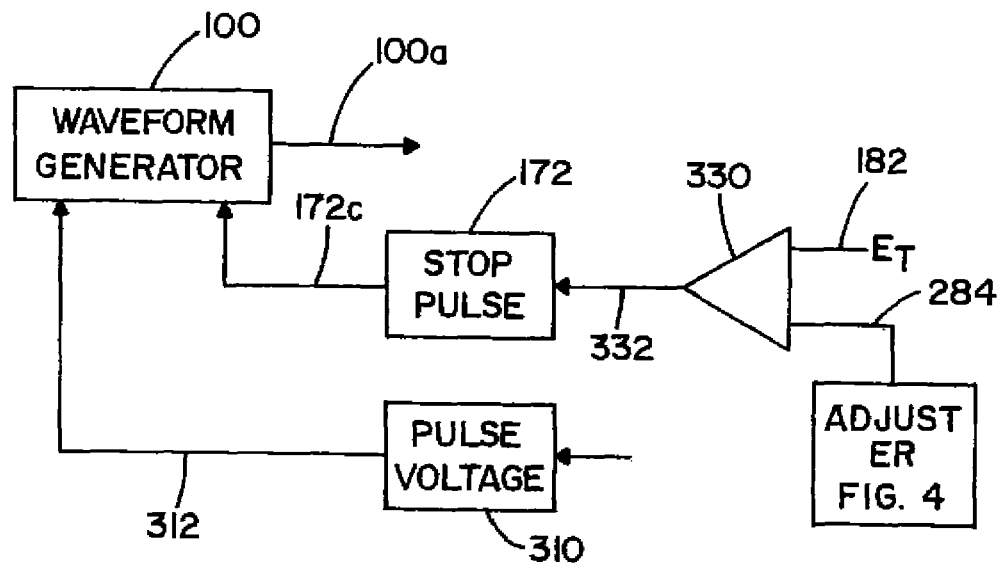
FIGS. 7 and 8 are partial flow chart block diagrams of the welding system as shown in FIG. 1 combining the embodiment of the present invention shown in FIG. 4 with a combined waveform control from the embodiments of the invention shown in FIGS. 5 and 6, respectively.
Figure 8:
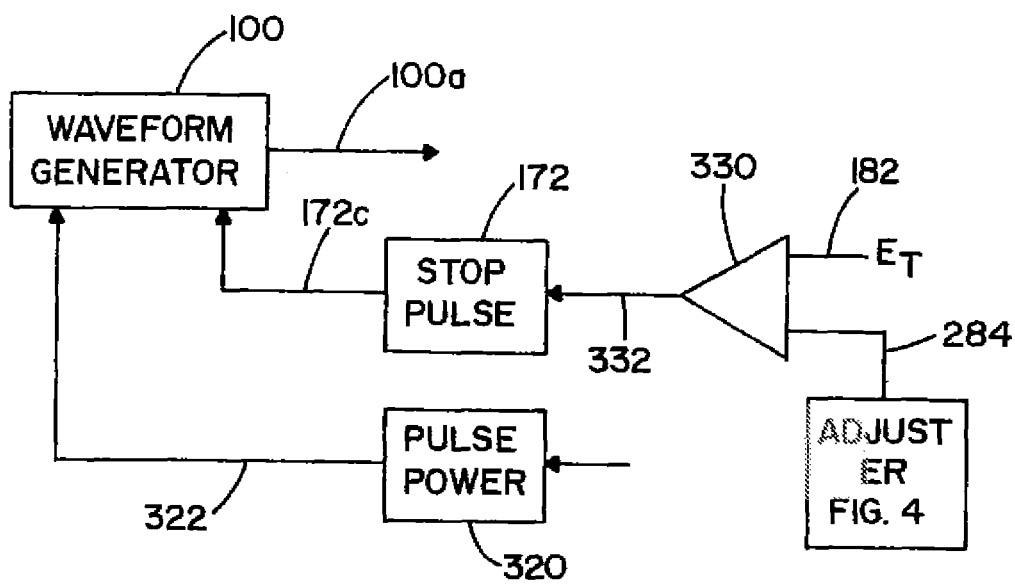

In accordance with another embodiment of the power source, the energy adjustment of melting pulse 212 is combined with the two modifications of the present invention illustrated in FIGS. 5 and 6. Such combination controls are shown in FIGS. 7 and 8 wherein prior summing junction 280 and digital filter 282 are illustrated as combined in analog error amplifier 330. The component or program has output 332 with a logic for stopping the melting pulse when the threshold energy has been reached, as indicated by the logic on line 182. Thus, the total energy of the pulse is controlled together with the pulse voltage control circuit 310 in FIG. 7 and the pulse power control 320 as shown in FIG. 8. Output 312 is combined with output 172c for controlling the waveform profile in line 100a of generator 100. In a like manner, the energy level is controlled by logic on line 172c in combination with the digital information on output line 322 of power pulse control circuit 320. Other combinations of parameters can be used to control melting pulse 212 to assure an accurate control of the time between the melting pulse and the short circuit event. Such other parameters are within the skill of the art in controlling a waveform generator by closed feedback loops.

Figure 9:
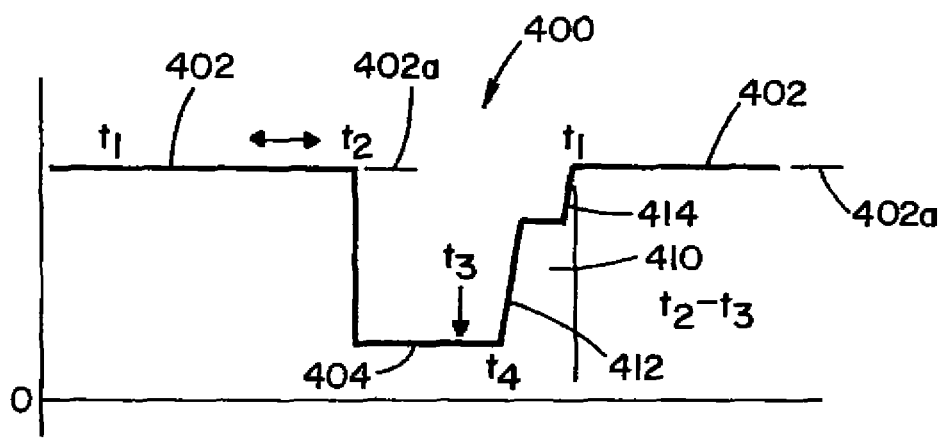
FIG. 9 is a current waveform for the DC positive implementation of the present invention.

In an exemplary embodiment of the present invention, the process is an AC process, as shown in FIG. 4; however, DC positive waveform 400 can be used as shown in FIG. 9. Melting pulse 402 has a high positive current 402a until the pulse is terminated at time $t_2$. The current, in the DC positive mode, is limited to a level below that needed for spray arc so the metal is not detached without shorting. This concept defines the short arc welding process. Then the waveform transitions into a low level positive current section 404 awaiting the short at time $t_3$. This low level positive current is used in an exemplary embodiment of the present invention and terminates at time $t_3$. Thereafter, short clearing pulse 410 is created by the waveform generator. Pulse 410 has high ramp area 412 and a stepped area 414 to bring the current back up to the high current level 402a. Various illustrated embodiments of the present invention can be used in implementing the positive current waveform 400; however, the logic on line 100b for controlling the polarity of the output waveform on lines 32, 34 is not necessary.

Figure 10:
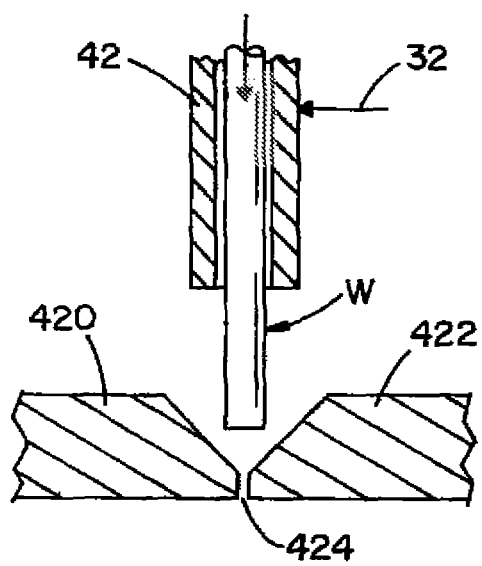
FIG. 10 is a schematic elevational view showing the invention used in the root pass or tacking pass of a pipe welding joint.

An exemplary embodiment of the power source is in pipe welding operation using a flux cored electrode as schematically represented in FIG. 1A. Such pipe welding operation is schematically illustrated in FIG. 10 wherein pipe sections 420, 422 define an open root 424. The present invention as shown in FIG. 4 controls the waveform on wire W as it moves through contact tip 42 to open root 424 of the pipe joint. FIG. 10 shows a particular embodiment using the present invention for welding the root pass of a pipe joint to tack the pipe sections together for subsequent joining with standard welding techniques.

In certain embodiments, the power sources and/or welding operations according to the present invention exhibit one or more of the following aspects. The current density is generally less than that required for spray welding since the primary mode of metal transfer is short circuit welding. As in many short circuit processes, a pinch current is established depending upon the wire diameter, for example for a 5/64 inch flux cored wire, a current of 625 amps can be used. Generally, the positive current tends to set the arc length. If the positive current is allowed to reach the same level as the negative current arc length, even for half a millisecond, the positive current arc will reach a non-desirable length. Generally, positive side control current is in the range of from about 50 amps to about 125 amps, and in one embodiment is about 75 amps. The negative portion of the wave shape can either be a constant power or voltage with a slope of from about 5 to 15 percent current. Typically, welding can be performed at about 60 hertz, 10 percent positive. Since the positive current is set at a relatively low level, the portion that the wave shape is positive is typically less than 20 percent.

Figure 11:
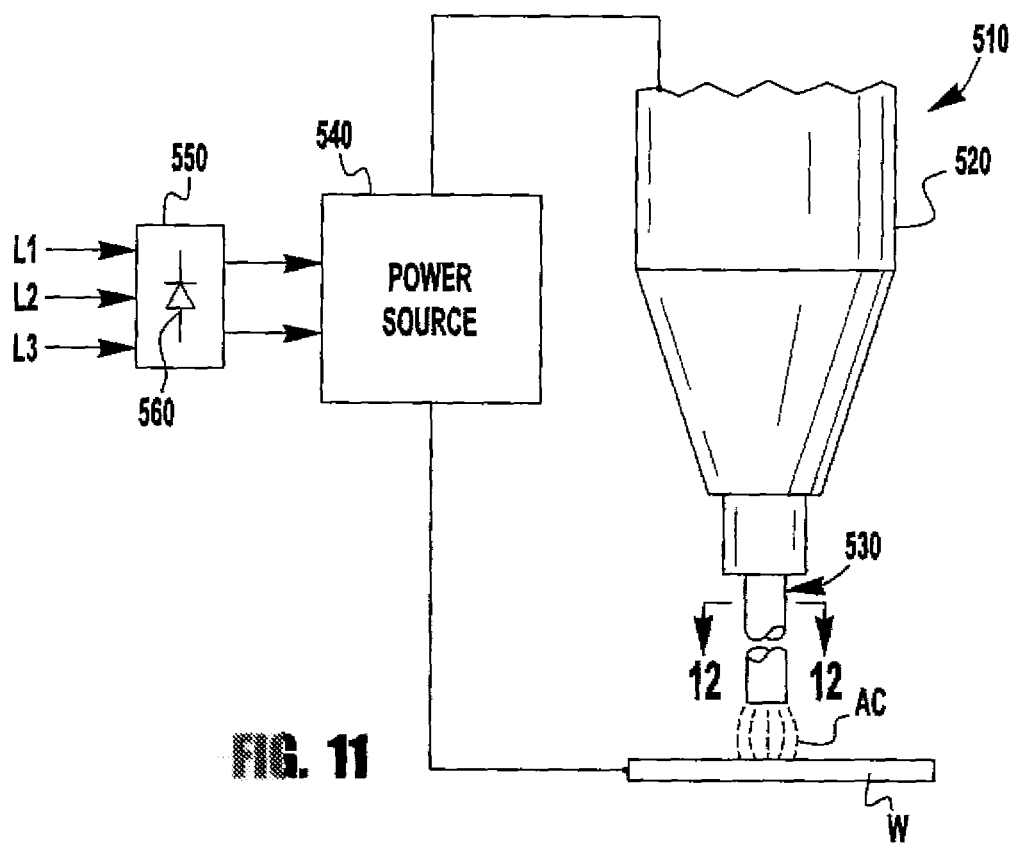
FIG. 11 is a side elevational view with a block diagram illustrating the use of a representative welding system and an electrode.
Figure 12:
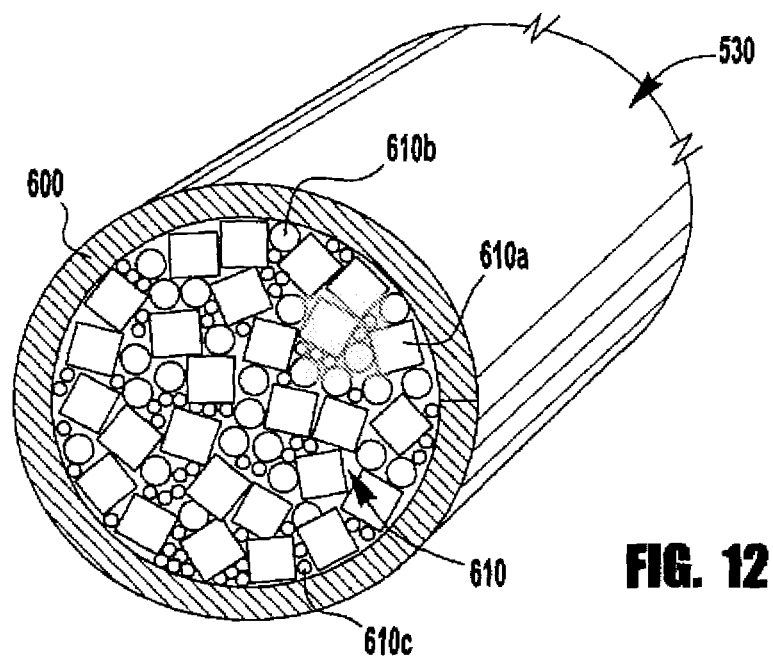
FIG. 12 is an enlarged cross-sectioned pictorial view taken generally along line 12-12 of FIG. 11, depicting the electrode in greater detail.

FIGS. 11 and 12 schematically illustrate a waveform technology welder and/or welding system 510, and a cored electrode 530. The welding system comprises a welder 510 having a torch 520 for directing an electrode 530 toward workpiece W. The welding system 510 includes a three phase input power supply L1, L2, and L3, which is rectified through rectifier 550, 560, and a power source 540. The power source 540 provides an output, and specifically, an AC waveform as described in U.S. application Ser. No. 11/263,064, filed Oct. 31, 2005, previously incorporated by reference. An arc AC is created between the end of electrode 530 and workpiece W. The electrode is a cored electrode with a sheath 600 and an internal filled core 610. The core includes flux ingredients, such as represented by particles 610a. The purpose of these ingredients 610a is to (a) shield the molten weld metal from atmospheric contamination by covering the molten metal with slag, (b) combine chemically with any atmospheric contaminants such that their negative impact on the weld quality is minimized and/or (c) generate arc shielding gases. In accordance with standard practice, core 610 also includes alloying ingredients, referred to as particles 610b, together with other miscellaneous particles 610c that are combined to provide the fill of core 610. In prior applications, to optimize the welding operation, it has been necessary to use solid wire with an external shielding gas. However, in order to produce a weld with specific mechanical and metallurgical properties, specific alloys are required, which can be difficult to obtain in the form of a solid wire. Further, gas shielding is not always a feasible alternative due to access to gas or difficulty to achieve adequate shielding due to windy conditions, accessibility to clean gas mixtures and difficult terrains. It is, therefore, advantageous to use a self shielding cored electrode, so that the environment does not affect the welding, as in the present invention.

Figure 13:
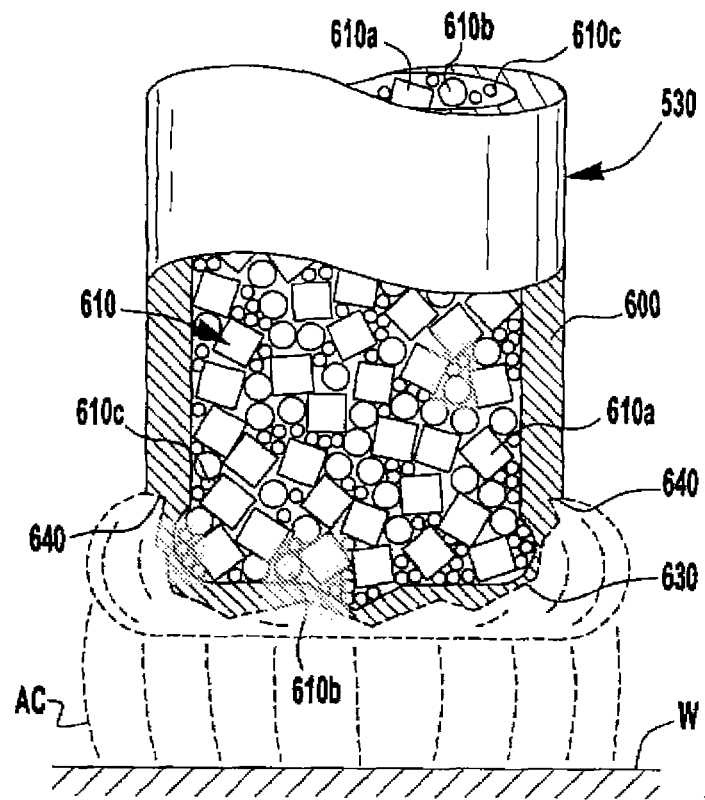
FIG. 13 is an enlarged, schematic view representing a cored electrode where the sheath and core are melted at different rates.
Figure 14:
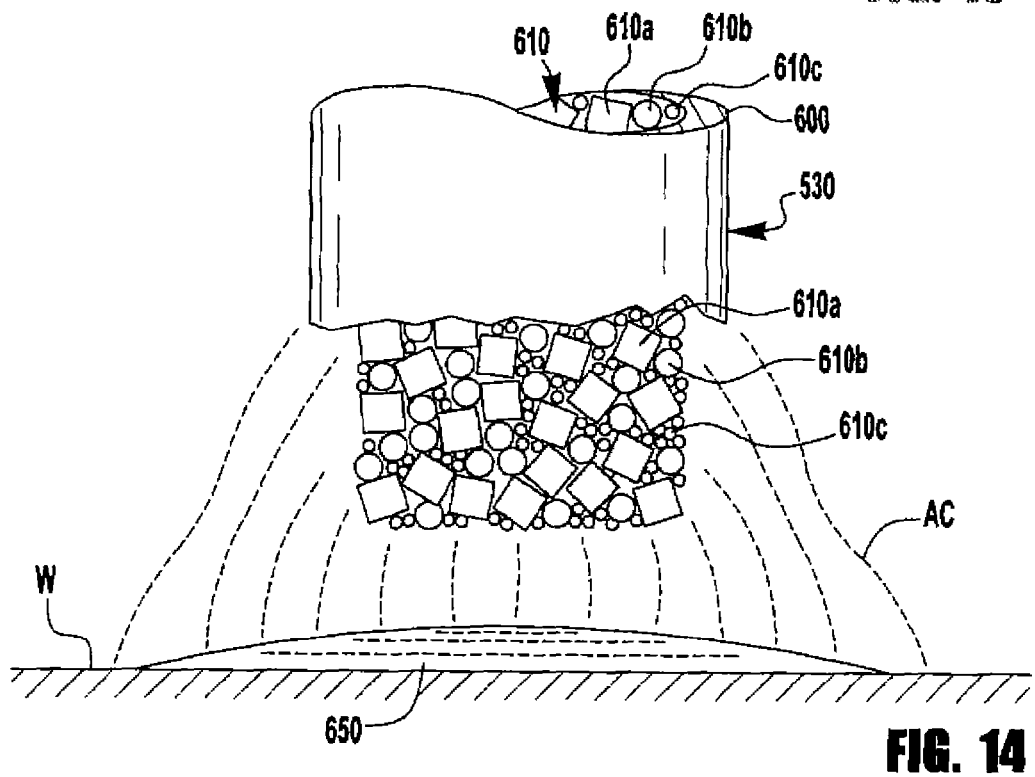
FIG. 14 is a view similar to FIG. 13 illustrating a disadvantage of a failure to employ a tailored waveform for welding with cored electrodes.

A common problem caused when using cored electrodes without control of the welding waveform profile is illustrated in FIG. 13. The welding process melts sheath 600 to provide a portion of molten metal 630 melted upwardly around the electrode, as indicated by melted upper end 640. Thus, the sheath of the electrode is melted more rapidly than the core. This causes a molten metal material to exist at the output end of electrode 530 without protective gas or chemical reaction created by melting of the internal constituents of core 610. Thus, arc AC melts the metal of electrode 610 in an unprotected atmosphere. The necessary shielding for the molten metal is formed when the sheath and core are melted at the same rate. The problem of melting the molten metal more rapidly than the core is further indicated by the pictorial representation of FIG. 14. Molten metal 650 from sheath 600 has already joined workpiece W before the core 610 has had an opportunity to be melted. Thus, the core 610 can not provide the necessary shielding for the welding process. FIGS. 13 and 14 show the reason why AC welding using cored electrodes has not been used for off-shore pipeline welding and other pipeline welding. However, an AC waveform can be utilized to control the heat input when using a cored electrode.

Figure 15:
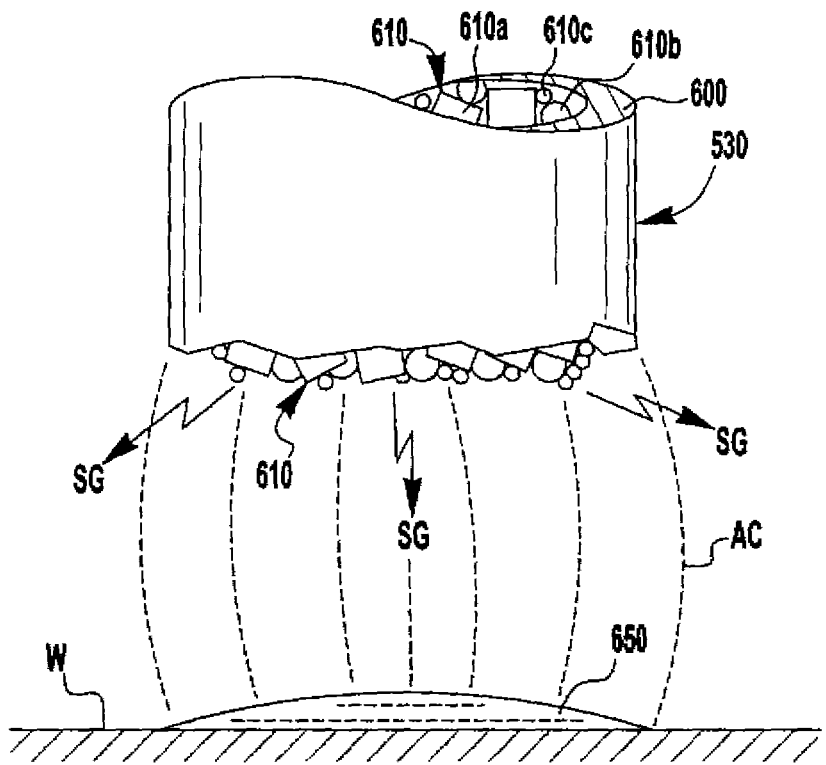
FIG. 15 is a view similar to FIGS. 13 and 14.

By controlling the precise profile for the AC waveform used in the welding process, sheath 600 and core 610 can be made to melt at approximately the same rate. The failure to adequately coordinate the melting of the sheath with the melting of the core is one reason why a shielding gas SG, as shown in FIG. 15 may be used. The advantage of controlling the profile of the AC waveform is that external shielding gas SG, may be avoided.

Although control of the AC waveform can lead to significant advantages, as previously noted, in order to provide arc stability and appropriate melting temperatures and rates, the actual control of the AC waveform, is quite complicated. And, even with the use of sophisticated AC waveforms, contamination of the weld is possible. Contamination of welds formed by using sophisticated AC waveforms, is still possible, even if shielding gas is used. Accordingly, in a preferred aspect of the present invention, certain electrode compositions are provided that, when used in conjunction with AC waveforms, can form strong, tough, and durable welds, without significant contamination problems, and without the degree of control otherwise required for the AC waveforms.

When welding by the method or power source, of the present invention, with a cored electrode, it is desired to have the sheath and core melt at the same rate. This operation promotes homogeneous mixing of certain core materials with the outer sheath, such that the mixture of molten materials chemically resists the effects of atmospheric contamination. Alloying elements required to produce desired weld metal mechanical and metallurgical characteristics are uniformly distributed in the weld metal. In addition, the protective benefits derived from slag and/or gas-forming constituents are optimized. As previously noted, this situation is illustrated in FIG. 15. In contrast, FIG. 14 illustrates a situation where the sheath has melted more rapidly than the core. In this deleterious situation, molten metal 650 from sheath 500 has already joined workpiece W before core 610 has had an opportunity to be melted. Metal 650 has not been protected from the effects of atmospheric contamination to the degree that it would have been if the unmelted core constituents had actually been melted. Additionally, alloying elements needed to achieve desired mechanical and metallurgical characteristics may be missing from molten metal 650.

Figure 16:
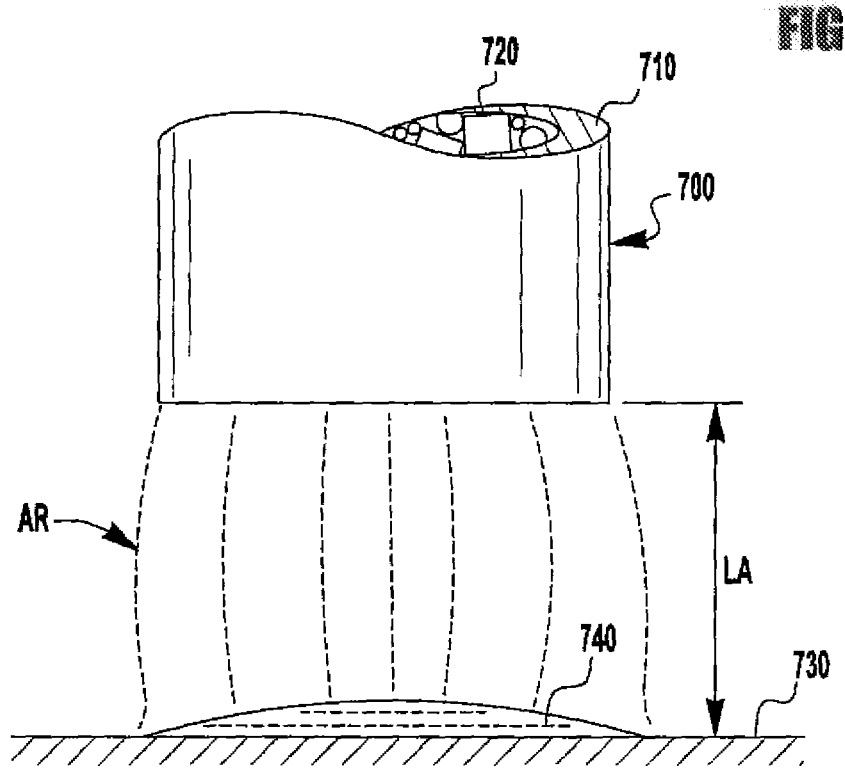
FIG. 16 is a partial, side elevational view illustrating a cored electrode in accordance with an embodiment of the present invention and showing the arc length, which length is minimized by use of the present invention.

As previously indicated, an electric welder of the type using waveform technology can be used for AC welding using a cored electrode, such as electrode 700 shown in FIG. 16. Such electrode includes an outer steel sheath 710 surrounding core 720 formed of particulate material, including alloying metals and slag or flux materials. By having internal flux or slag materials, there is no need for external shielding gas during the welding operation. By including alloying material in core 720, the puddle of weld metal 740 on workpiece 730 can be modified to have exact alloy constituents. This is an advantage and reason for using cored electrodes, instead of solid welding wire where alloying must be accomplished by the actual constituent of the welding wire. Adjustment of alloying for the weld metal is quite difficult when using solid welding wire. Therefore, it is advantageous in high quality welding to employ a cored, i.e. self-shielded electrode. Arc AR melts sheath 710 and melts constituents or fill in core 720 at a rate which can be controlled to be essentially the same. Contamination in weld metal 740, such as hydrogen, nitrogen and oxygen can cause porosity problems, cracking and other types of physical defects in the weld metal. Thus, it is a challenge to design the welding process to exclude contaminates from the molten weld metal. It is common to use "killing" agents, typically silicon, aluminum, titanium and/or zirconium which will combine chemically with potential contaminates to prevent them from forming porosity or harmful inclusions in the weld metal. Furthermore, "scavengers" may also be added to react with hydrogen containing a species in order to remove hydrogen from the weld. In order to deposit consistently sound weld metal 740, it has often been necessary to add such killing agents in quantities that are themselves detrimental to properties of the weld metal, such as ductility and low temperature toughness. Thus, it is desirable to reduce the exposure of the molten metal in arc AR to prevent contamination of the metal passing from electrode 700 to workpiece 730 so the killing agents can be minimized.

The electrode compositions, of the present invention, when used in AC welding, produce desirable welds that are durable, tough, and which are not susceptible to problems otherwise associated with the use of conventional electrode compositions. The electrode compositions of the present invention may be used in conjunction with AC waveforms where the positive and negative shapes of the AC waveform are modified to reduce the overall arc length LA. In this manner, there is less exposure to the atmosphere and less time during which the metal is molten. A detailed description of the AC waveforms and related welding processes, for which the present invention electrode compositions are designed, is set forth in U.S. application Ser. No. 11/263,064, filed Oct. 31, 2005, previously incorporated by reference. Indeed, by reducing the arc length, the temperature of the molten metal can be reduced as it travels from the electrode 700 to weld metal puddle 740. Typically, when using a welder that can perform an AC welding process with different shapes for the negative and positive sections, AC welding with cored electrodes can be used effectively in the field. Parameters of the positive and negative portions of the alternating waveform can be independently adjusted to compensate for and optimize the melting of both sheath 710 and cored 720 for selected electrode 700.

More specifically, an embodiment of the present invention involves the combination of an electrode and an AC welding wherein the positive and negative sections of the waveform are individually adjusted to accomplish the objective of a low arc length and reduce contamination. Using this strategy, the electrode composition of the present invention, particularly because it is self-shielding, can provide significant advantages. The electrodes are used without shielding gas and depending upon the particular application, can rely on deoxidizing and denitriding agents in the core for additional protection from atmospheric contamination.

Thus, an embodiment of the present invention provides a synergistic system of a welding method with a unique set of alloying and flux components in the core of a FCAW-S electrode. As noted, a cored electrode is a continuously fed tubular metal sheath with a core of powdered flux and/or alloying ingredients. These may include fluxing elements, deoxidizing and denitriding agents, and alloying materials, as well as elements that increase toughness and strength, improve corrosion resistance, and stabilize the arc. Typical core materials may include aluminum, calcium, carbon, chromium, iron, manganese, and other elements and materials. While flux cored electrodes are more widely used, metal-cored products are useful for adjusting the filler metal composition when welding alloy steels. The powders in metal-cored electrodes generally are metal and alloy powders, rather than compounds, producing only small islands of slag on the face of the weld. By contrast, flux cored electrodes produce an extensive slag cover during welding, which supports and shapes the bead.

The alloy/flux system, of the present invention, comprises particular amounts of a barium source, particular amounts of a lithium source, lithium oxide, iron oxide, and optional amounts of calcium oxide, silicon oxide, and manganese oxide. One or more fluoride, oxide and/or carbonate salts of barium can be used for the barium source. And, one or more fluoride and/or carbonate salts of lithium can be used for the lithium source. The alloy/flux system is included in the electrode fill. The electrode fill generally constitutes from about 18 to about 24% of the electrode. An exemplary embodiment of the alloy/flux system comprises:

from about 35 to about 55% barium fluoride as the barium source, from about 2 to about 12% lithium fluoride as the lithium source, from about 0 to about 8% barium carbonate as a secondary barium source, from about 0 to about 8% lithium carbonate as the secondary lithium source, from about 0 to about 15% of lithium oxide, from about 0 to about 15% of barium oxide, from about 5 to about 20% of iron oxide, from about 0 to about 5% of calcium oxide, from about 0 to about 5% of silicon oxide, from about 0 to about 5% of manganese oxide, and up to about 25% of aluminum, magnesium, titanium, zirconium, or combinations thereof, for deoxidation and denitriding and the remaining metallics optionally including iron, nickel, manganese, silicon, or combinations thereof. All percentages expressed herein are percentages by weight unless noted otherwise. In an embodiment, the electrode fill composition comprises from about 35 to about 55% barium fluoride, from about 2 to about 12% lithium fluoride, from about 0 to about 15% lithium oxide, from about 0 to about 15% barium oxide, from about 5 to about 20% iron oxide, and up to about 25% of a deoxidizing and denitriding agent as previously noted. In other embodiments, the previously noted electrode fill composition can also include from about 0 to about 8% barium carbonate. In yet another embodiment, the electrode fill composition may additionally include from about 0 to about 8% lithium carbonate. In yet another embodiment, the fill composition can include from about 0 to about 5% calcium oxide. In yet a further embodiment, the electrode fill composition can include from about 0 to about 5% silicon oxide. And, in another embodiment, the electrode fill composition can comprise from about 0 to about 5% manganese oxide. Other embodiments include the use of one or more of these agents, i.e. the barium carbonate, lithium carbonate, calcium oxide, silicon oxide, manganese oxide, and combinations thereof.

An exemplary embodiment of the method, of the present invention, comprises applying a first negative voltage between an electrode and a substrate to cause at least partial melting of the electrode near the substrate. The method also comprises applying a positive voltage between the electrode and the substrate to promote formation of a flowable mass of material from the electrode. The method further comprises monitoring for occurrence of an electrical short between the electrode and the substrate through the flowable mass. The method further comprises upon detecting an electrical short, applying a second negative voltage between the electrode and the substrate. And, the method comprises increasing the magnitude of the second negative voltage, to thereby clear the electrical short and form a weld on the substrate from the flowable mass. The composition of the electrode fill in a flux cored electrode comprises from about 35 to about 55% barium fluoride, from about 2 to about 12% lithium fluoride, from about 0 to about 15% lithium oxide, from about 0 to about 15% barium oxide, from about 5 to about 20% iron oxide, and up to about 25% of a deoxidation and denitriding agent selected from the group consisting of aluminum, magnesium, titanium, zirconium, and combinations thereof. In other embodiments, additional agents can be incorporated in the electrode fill. For instance, from about 0 to about 8% barium carbonate can be included. Another embodiment of the electrode fill composition includes from about 0 to about 8% lithium carbonate. Yet another embodiment includes from about 0 to about 5% calcium oxide. Another embodiment includes from about 0 to about 5% silicon oxide. And, yet another embodiment includes from about 0 to about 5% manganese oxide. In yet a further embodiment, one or more of these agents can be added or otherwise included in the electrode fill composition. For example, the electrode fill can also comprise, in addition to the previously noted proportions of barium fluoride, lithium fluoride, lithium oxide, barium oxide, iron oxide, and one or more particular deoxidation and denitriding agents from about 0 to about 8% barium carbonate, from about 0 to about 8% lithium carbonate, from about 0 to about 5% calcium oxide, from about 0 to about 5% silicon oxide, and from about 0 to about 5% manganese oxide.

The flux/alloy system is modified from traditional flux/alloy systems used for FCAW-S electrodes to achieve the short arc length and to weld at low heat inputs that result from the unique waveforms used in this process. The short arc length and the stable arc is a result of the combination of the alloy and flux system and the unique characteristics of the waveform. In essence, both the welding consumable and the process are optimized in tandem to achieve the final weld product requirements.

In certain embodiments, the present invention provides methods of forming weld metals having attractive properties Generally, these methods involve providing a welding wire or electrode having a core with the previously described composition. In an embodiment, the welding wire or electrode is used free of shielding gas, or rather agents that form such a gas. The methods also include an operation in which the wire or electrode is moved toward the region of interest, such as a joint formed between two sections of pipe. In an additional embodiment, such movement is made at a controlled feed speed. The method also includes creating a welding current to melt the wire or electrode by an arc between the wire and the pipe sections to thereby form a molten metal bead in the joint. The method also includes transferring the melted wire to the molten metal bead by a succession of short circuit events. The method is particularly well suited for application to welding of a joint between two sections of pipe formed from a metal having a yield strength of at least about 70 ksi and a thickness less than about 0.75 inches. In a further embodiment, the invention can provide a weld, without the use of gas-shielding, having a yield strength of at least 80 ksi, thus providing a weld which satisfies the requirements for welding at least American Petroleum Institute (API) Grade X-80 line pipe. Further, an exemplary embodiment of the present invention can achieve over 550 MPa yield strength and 690 MPa tensile strength, and a Charpy V-Notch (CVN) toughness of over 60 Joules at −20 degrees C.

However, it will be appreciated that the present invention can be used in applications on pipes having thicknesses greater than or less than 0.75 inches. In one embodiment, the resulting bead that is formed generally has a tensile strength greater than 70 ksi and in certain applications, greater than about 90 ksi. In particular aspects, the melting current can be negative. If the melting current is negative, the metal transferring operation can be performed by a positive current. The metal transferring can however, be performed by a positive current independent of the melting current. When performing the previously described method, in one embodiment the average arc length is less than 0.30 inches, and in a further embodiment is less than 0.20 inches, and in another embodiment is less than 0.10 inches. In an embodiment of the previously described method, the rate of the short circuit events is automatically controlled. The rate of short circuit events is generally from about 40 to about 100 cycles per second.

In other embodiments, the previously described concepts, i.e. using the power sources and control techniques in combination with the electrode compositions noted herein, can be utilized to produce a weld metal having a minimum Charpy V-Notch toughness of 60 J at −20° C. Similarly, the methods can be used to produce a weld metal having a minimum Charpy V-Notch toughness of 40 J at −40° C. And, the methods can be used to produce a weld metal having a tensile strength exceeding 90 ksi. Thus, thin pipe of less than about 0.75 inches can be used with the resultant savings. No shielding gas is needed, so the cost of on site gas is eliminated, or greatly reduced.

The present application can be utilized in a wide array of applications. The system, process, and/or compositions described herein are particularly adapted for use in welding at least X80 pipe (the designation X80 being in accordance with the API 5L:2000 industry specification) with self-shielded flux core wire. However, the present invention can be utilized in conjunction with other pipe grades. The present invention can also be utilized in "root pass" or tack welding operations performed on pipes. The present invention can be utilized to melt greater amounts of welding wire with less arc force as compared to currently known practices of using a buried short arc for the initial welding pass. Yet another application for the present invention is in robotic welding applications for high speed welding of thin gauge metals.

EXAMPLE

The following discussion is directed to an example of the present invention. The present invention is not limited to the embodiment and results discussed below, but the following discussion is provided to demonstrate the results achievable from an exemplary embodiment of the present invention.

A series of test welds were made using an embodiment of the present invention, in which a self-shielded, flux cored electrode was used in a short arc welding process. In some tests a 0.062 inch diameter Lincoln Innershield NR-233 was used. The welds were made at a constant wire feed speed and travel speed. The welds were bead on plate welds, having three passes side-by-side, then two passes side-by-side in a second layer on top of the first three passes. The plate surfaces were shot blasted prior to welding to remove scale and dirt. The weld metal layer in the second layer was analyzed for nitrogen content. Because no nitrogen was intentionally incorporated in the electrodes used, the following analysis was conducted under the assumption that the nitrogen in the weld metal came from the ambient atmosphere.

Further, the welding power supply was constructed to produce alternating current with variable waveforms, and the following characteristics of the AC waveform were varied:
  "waveform balance"—the waveform balance is the percentage of the AC cycle time when the electrode polarity is positive; and
  "DC offset"—the DC offset is the measure of the degree to which the amplitudes of the positive and negative portions of the waveform are unequal. A DC offset of −20 indicates that the amplitude of the positive portion of the waveform was 19.4 volts, while the negative portion is 23 volts. Further, +20 indicates the reverse, i.e. −23 volts positive and 19.4 volts negative.

Figure 17:
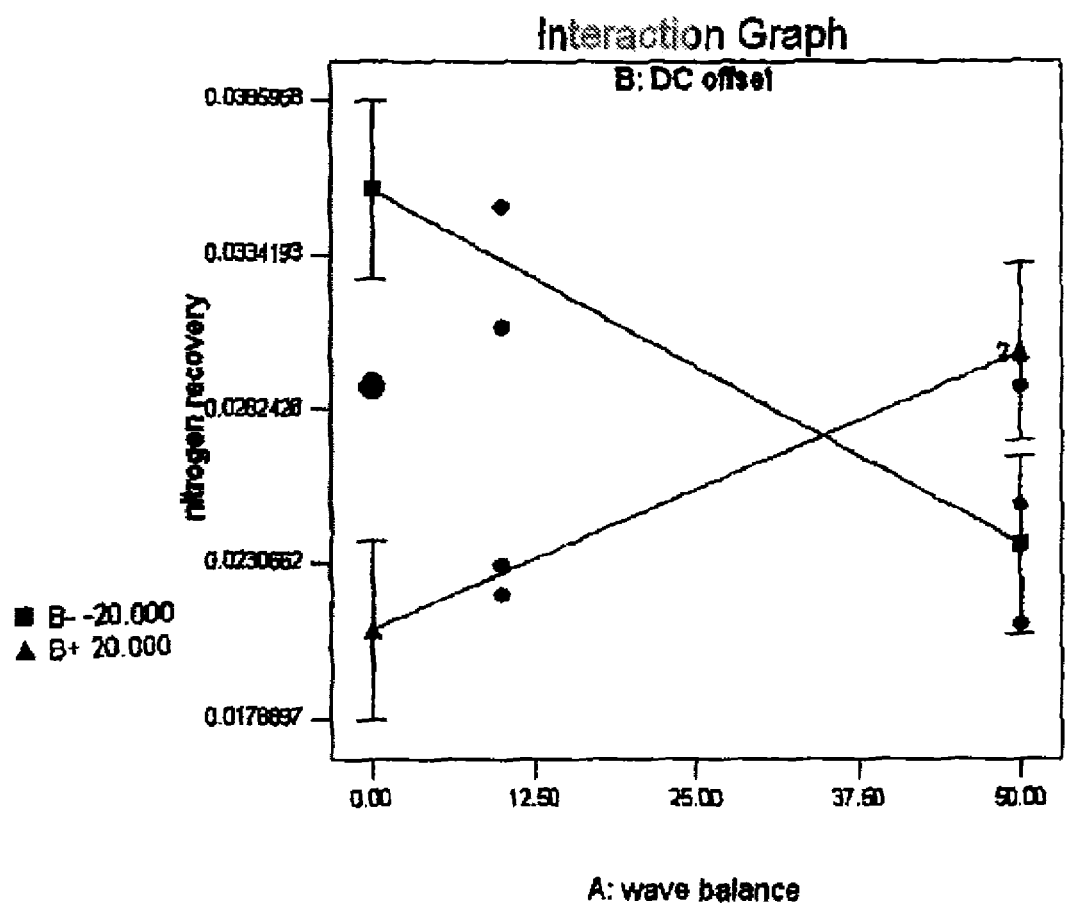
FIG. 17 shows the influence of wave balance and DC offset on weld metal nitrogen recovery in an example of the present invention.

FIG. 17 depicts the influence of wave balance and DC offset on weld metal nitrogen recovery in an example weld performed by an example of the claimed invention. As shown in FIG. 17, the large data point at 0% wave balance, 0.029% nitrogen recovery, is the result for the weld made with DC− current. The two welds made at 10% wave balance, +20 DC offset, and the two made at 50% wave balance, −20 DC offset had significantly lower nitrogen recoveries than the DC− weld. Additionally, during testing it was noted that nitrogen recoveries higher than that observed with DC− were observed with other combinations of wave balance and DC offset.

Further, in additional embodiments the AC waveform can also be manipulated to control levels of oxygen and hydrogen in the weld metal. Reducing overall levels of contamination reduces the need for killing, scavenging, or geometry-modifying or solubility-limiting agents. Thus, alloy levels in the self-shielding electrode can be optimized to achieve optimum physical properties in the weld metal.

Figure 18:
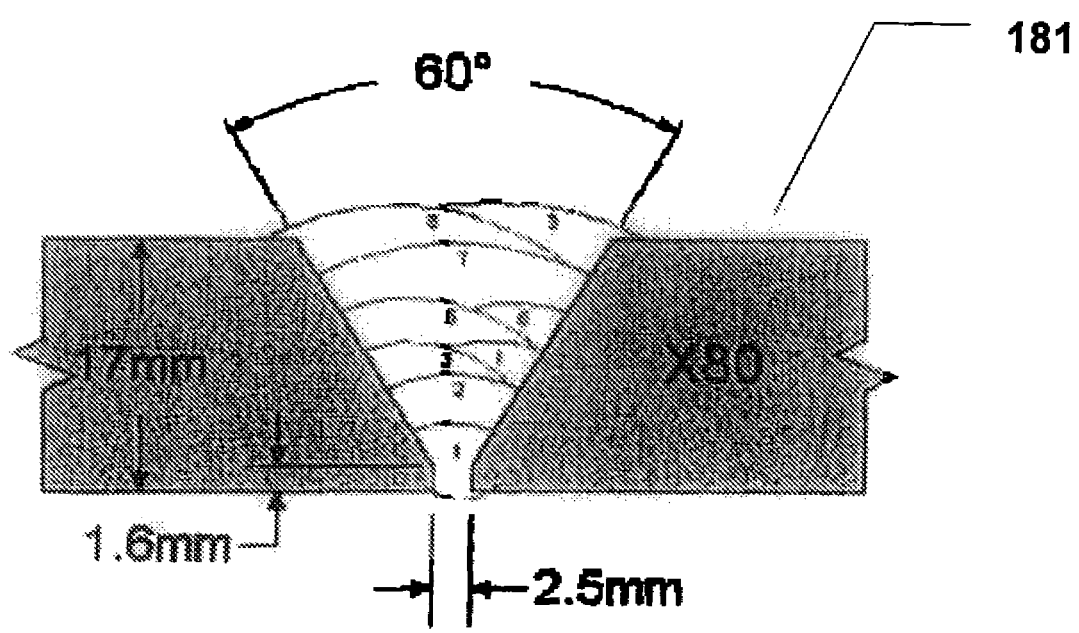
FIG. 18 depicts the joint design of an example weld performed in accordance with an exemplary embodiment of the present invention.

The following Tables provide weld data and specifications of a weld example performed in accordance with an embodiment of the present invention. In this example, a Pipeliner® electrode, from The Lincoln Electric Company, Cleveland Ohio, was used in the 5G position according to the procedures set forth below in Table 1. Additionally, FIG. 18 depicts a weld joint design structure corresponding with the data shown in the Tables below. The metal welded 181 was API Grade X-80 having a 17 mm thickness and the weld structure was as shown in FIG. 18. Further, as shown in FIG. 18, the weld passes are shown as passes #1 through #9. Table 2 shows the mechanical test results of the weld performed in accordance with Table 1. Finally, Table 3 shows the weld deposit chemistry of the example set forth in Table 1.

TABLE 1

Welding Procedures:

| | |
|---|---|
| Pass 1 (Root) | 0.045" Pipeliner ® 70S-G (ER70S-G) |
| Semi-automatic | 155 A, 17.5 V DC + |
| Vertical-down | WFS 4.1 m/min (160 in/min) |
| 100% $CO_2$ | STT II: 400 A Peak, 60 A Back, 0 Tail |
| Pass 2-9 (Hot-Cap) | 2.0 mm Pipeliner ® M2M80 (FCAW-S) |
| Semi-automatic | 200 A, 21 V |
| Vertical-down | WFS 2.3 to 2.5 m/min (90 to 100 in/min) |
| Position | 5G Horizontal Fixed |
| Heat Input (avg.) | 1.4 kJ/mm          35 kJ/in |
| Preheat/Interpass | 65.56/121.1° C.    150/250° F. |
| Pipe | API 5L X80         DSAW (Napa) |
| $R_{p0.2}$ ($YS_{0.2\%}$) | 608 MPa            88.1 ksi |
| Diameter × Wall | 915 × 17 mm        36 × 0.667 in |

TABLE 2

Mechanical Test Results (weld metal - as welded):

Tensile (ASTM E8) All weld metal, 6.35 mm (0.25 in) dia.

| | | | |
|---|---|---|---|
| $R_{p0.2}$ ($YS_{0.2\%}$) | average | 656 MPa | 95 ksi |
| | min-max | 649-662 MPa | 94-96 ksi |
| $R_m$ (UTS) | average | 725 MPa | 105 ksi |
| | min-max | 718-731 MPa | 104-106 ksi |
| $A_5$ (Elong.) | average | 25% | 25% |
| | min-max | 25-26% | 25-26% |

Charpy V-Notch (ASTM E23) Mid-wall, 10 mm × 10 mm

| | | | |
|---|---|---|---|
| −20° C. (−4° F.) | average | 97 J | 75 ft-lb |
| | min-max | 83-117 J | 64-91 ft-lb |
| −29° C. (−20° F.) | average | 59 J | 46 ft-lb |
| | min-max | 35-77 J | 27-60 ft-lb |
| −40° C. (−40° F.) | average | 41 J | 32 ft-lb |
| | min-max | 34-46 J | 26-36 ft-lb |

TABLE 3

Weld Deposit Chemistry (SPJ):
Chemistry (ASTM E350)

| Element | % |
|---|---|
| C | 0.026 |
| Mn | 3.43 |
| Si | 0.10 |
| P | 0.010 |
| S | 0.009 |
| Ni | 0.77 |
| Cr | 0.03 |
| Mo | 0.01 |
| B | 0.0022 |
| Ti | 0.010 |
| V | 0.02 |
| Nb | 0.016 |
| Al | 1.06 |

The above example is intended to merely exemplary of an embodiment of the present invention, and is not intended to limit the scope of the present invention in any way.

In an embodiment of the present invention the short arc welding device is a welding device which employs a welding gun to continuously advance the electrode toward the workpiece to be welded. This is similar to a MIG welding process. However, as indicated above, the process is a gas-loss process using self-shielding flux-cored electrodes. Further, the method of welding using the short arc welding system and the disclosed electrode is a welding method similar to MIG welding, in that the electrode is continuously advanced through a welding gun.

Moreover, further to the discussions above, in further embodiments of the present invention, the welding device can be an engine driven machine or a fuel cell, or battery base, driven machine. Additionally, the present invention may also be employed with automatic or robotic welding machines.

The present invention has been described with certain embodiments and applications. These can be combined and interchanged without departing from the scope of the invention as defined in the appended claims. The systems, methods, electrodes and combinations thereof as defined in these appended claims are incorporated by reference herein as if part of the description of the novel features of the synergistic invention.

We claim:

1. A method of welding a workpiece, the method comprising:
    advancing a self-shielding electrode from a welding device toward the workpiece; and
    employing a short arc welding process with an average arc length of up to 0.3 inches to weld the workpiece using the advancing self-shielded electrode,
    wherein the weld has a yield strength of at least 70 ksi, and
    wherein no externally supplied shielding is used during said employing.

2. The method of claim 1, wherein the electrode is a flux cored self-shielding electrode.

3. The method of claim 1, wherein the electrode is advanced through a welding gun toward the workpiece.

4. The method of claim 1, wherein the yield strength is at least 80 ksi.

5. The method of claim 1, wherein the weld has a tensile strength of at least 70 ksi.

6. The method of claim 1, wherein the weld has a tensile strength of at least 90 ksi.

7. The method of claim 1, wherein the weld has a Charpy V-Notch toughness of at least 60 J at −20 degrees C.

8. The method of claim 1, wherein the weld has a Charpy V-Notch toughness of at least 40 J at −40 degrees C.

9. The method of claim 4, wherein the workpiece is a pipe.

10. The method of claim 1, wherein the self-shielding electrode is a self-shielded flux cored arc welding wire.

11. The method of claim 1, further comprising:
    controlling a melting pulse of the short arc welding process, where the melting pulse is followed by a low current transfer cycle, by
        measuring a duration time between said melting pulse and a short circuit during said transfer cycle;
        setting a desired time for said duration;
        creating a corrective signal by comparing said measured duration and said set desired time; and
        adjusting a parameter of said melting pulse based upon said corrective signal.

12. The method of claim 1, wherein an average arc length during said short arc welding process is up to 0.2 inches.

13. The method of claim 1, wherein an average arc length during said short arc welding process is up to 0.1 inches.

14. A method of welding a workpiece, the method comprising:
    advancing a self-shielding electrode from a welding device toward a workpiece; and
    employing a short arc welding process with an average arc length of up to 0.3 inches to weld the workpiece using the advancing self-shielded electrode,
    wherein the weld has a tensile strength of at least 70 ksi and the workpiece is a pipe, and
    wherein no externally supplied shielding is used during said employing.

15. The method of claim 14, wherein the electrode is a flux cored self-shielding electrode.

16. The method of claim 14, wherein the electrode is advanced through a welding gun toward the workpiece.

17. The method of claim 14, wherein the weld has a tensile strength of at least 80 ksi.

18. The method of claim 14, wherein the weld has a tensile strength of at least 90 ksi.

19. The method of claim 14, wherein the weld has a Charpy V-Notch toughness of at least 60 J at −20 degrees C.

20. The method of claim 14, wherein the weld has a Charpy V-Notch toughness of at least 40 J at −40 degrees C.

21. The method of claim 14, wherein the self-shielding electrode is a self-shielded flux cored arc welding wire.

22. The method of claim 14, further comprising:
    controlling a melting pulse of the short arc welding process, where the melting pulse is followed by a low current transfer cycle, by
        measuring a duration time between said melting pulse and a short circuit during said transfer cycle;
        setting a desired time for said duration;
        creating a corrective signal by comparing said measured duration and said set desired time; and
        adjusting a parameter of said melting pulse based upon said corrective signal.

23. The method of claim 14, wherein an average arc length during said short arc welding process is up to 0.2 inches.

24. The method of claim 14, wherein an average arc length during said short arc welding process is up to 0.1 inches.

25. A method of welding a workpiece; the method comprising:
    advancing a self-shielding electrode from a welding device toward a workpiece; and
    employing a short arc welding process with an average arc length of up to 0.3 inches to weld the workpiece using the advancing self-shielded electrode,
    wherein the weld has a Charpy V-Notch toughness of at least 60 J at −20 degrees C., and
    wherein no externally supplied shielding is used during said employing.

26. The method of claim 25, wherein the electrode is a flux cored self-shielding electrode.

27. The method of claim 25, wherein the electrode is advanced through a welding gun toward the workpiece.

28. The method of claim 25, wherein the weld has a yield strength of at least 70 ksi.

29. The method of claim 25, wherein the weld has a yield strength of at least 80 ksi.

30. The method of claim 25, wherein the weld has a tensile strength of at least 70 ksi.

31. The method of claim 25, wherein the weld has a tensile strength of at least 90 ksi.

32. The method of claim 25, wherein the weld has a Charpy V-Notch toughness of at least 40 J at −40 degrees C.

33. The method of claim 29, wherein the workpiece is a pipe.

34. The method of claim 25, wherein the self-shielding electrode is a self-shielded flux cored arc welding wire.

35. The method of claim 25, further comprising:
    controlling a melting pulse of the short arc welding process, where the melting pulse is followed by a low current transfer cycle, by
        measuring a duration time between said melting pulse and a short circuit during said transfer cycle;
        setting a desired time for said duration;
        creating a corrective signal by comparing said measured duration and said set desired time; and
        adjusting a parameter of said melting pulse based upon said corrective signal.

36. The method of claim 25, wherein an average arc length during said short arc welding process is up to 0.2 inches.

37. The method of claim 25, wherein an average arc length during said short arc welding process is up to 0.1 inches.

38. A method of welding, the method comprising:
advancing a self-shielding flux-cored electrode from a welding gun toward a workpiece; and
employing a short arc welding process with an average arc length of up to 0.3 inches to weld the workpiece using the advancing self-shielded electrode,
wherein the weld has a yield strength of at least 70 ksi, and
wherein no externally supplied shielding is used during said employing.

39. A method of welding, the method comprising:
advancing a self-shielding flux-cored electrode from a welding gun toward a workpiece; and
employing a short arc welding process with an average arc length of up to 0.3 inches to weld the workpiece using the advancing self-shielded electrode,
wherein the weld has a yield strength of at least 80 ksi and the workpiece is a pipe, and
wherein no externally supplied shielding is used during said employing.

40. A method of welding, the method comprising:
advancing a self-shielding flux-cored electrode from a welding gun toward a workpiece; and
employing a short arc welding process with an average arc length of up to 0.3 inches to weld the workpiece using the advancing self-shielded electrode,
wherein the weld has a Charpy V-Notch toughness of at least 60 J at −20 degrees C., and
wherein no externally supplied shielding is used during said employing.

41. A welding apparatus, comprising:
a short arc welding system which advances an electrode toward a workpiece to be welded;
wherein said electrode is a self-shielding electrode; and
wherein said short arc welding system is controlled to produce a weld that has a yield strength of at least 70 ksi, and
wherein said short arc welding system maintains an average arc length of up to 0.3 inches during a short arc welding process.

42. A welding apparatus, comprising:
a short arc welding system which advances an electrode toward a workpiece to be welded;
wherein said electrode is a self-shielding electrode; and
wherein the short arc welding system is controlled to produce a weld that has a yield strength of at least 80 ksi,
wherein the workpiece is a pipe, and
wherein said short arc welding system maintains an average arc length of up to 0.3 inches during a short arc welding process.

43. A welding apparatus, comprising:
a short arc welding system which advances an electrode toward a workpiece to be welded;
wherein said electrode is a self-shielding electrode; and
wherein the short arc welding system is controlled to produce a weld that has a Charpy V-Notch toughness of at least 60 J at −20 degrees C., and
wherein said short arc welding system maintains an average arc length of up to 0.3 inches during a short arc welding process.

* * * * *